United States Patent [19]
Okamura et al.

[11] Patent Number: 5,714,967
[45] Date of Patent: Feb. 3, 1998

[54] HEAD-MOUNTED OR FACE-MOUNTED IMAGE DISPLAY APPARATUS WITH AN INCREASED EXIT PUPIL

[75] Inventors: Toshiro Okamura, Hino; Masato Yasugaki, Kunitachi, both of Japan

[73] Assignee: Olympus Optical Co., Ltd., Tokyo, Japan

[21] Appl. No.: 437,790

[22] Filed: May 9, 1995

[30] Foreign Application Priority Data

May 16, 1994 [JP] Japan ................................ 6-100959
Feb. 6, 1995 [JP] Japan ................................ 7-017638

[51] Int. Cl.⁶ .................................................. G02B 27/02
[52] U.S. Cl. ................ 345/8; 351/209; 359/630; 359/389; 345/9; 353/34; 353/82
[58] Field of Search ........................... 359/630, 389; 345/8, 9; 351/204, 209, 210; 353/34, 82

[56] References Cited

U.S. PATENT DOCUMENTS

| | | | |
|---|---|---|---|
| 5,106,179 | 4/1992 | Kamaya et al. | 351/158 |
| 5,276,471 | 1/1994 | Yamauchi et al. | 345/8 |
| 5,334,991 | 8/1994 | Wells et al. | 345/8 |
| 5,384,654 | 1/1995 | Iba | 359/630 X |
| 5,392,158 | 2/1995 | Tosaki | 359/630 X |
| 5,410,376 | 4/1995 | Cornsweet et al. | 351/210 |
| 5,467,104 | 11/1995 | Furness, III et al. | 345/8 |
| 5,467,205 | 11/1995 | Kuba et al. | 359/630 X |
| 5,483,307 | 1/1996 | Anderson | 359/630 X |
| 5,499,138 | 3/1996 | Iba | 345/8 X |

FOREIGN PATENT DOCUMENTS 2136818  5/1990  Japan .

*Primary Examiner*—Raymond J. Bayerl
*Assistant Examiner*—Seth D. Vail
*Attorney, Agent, or Firm*—Cushman, Darby & Cushman IP Group of Pillsbury Madison & Sutro LLP

[57] ABSTRACT

An image display apparatus designed so that the observer can view the image of an image display device without the need of manually adjusting the positional relationship between the observer's eyeball and a bundle of rays from the image display device which is to be projected into the eyeball. A positional relationship detecting section (46) observes the pupil of an observer's eyeball (44) and its vicinities, and detects where a bundle of rays from an LCD (42) is being projected. If it is detected that the ray bundle is not coincident with the pupil, motors (52a and 52b) are driven to move a first support (50a) and a second support (50b), which support the LCD (42), a backlight (43), and an ocular lens (45), so that the ray bundle passes through the pupil.

14 Claims, 19 Drawing Sheets

FIG. 18
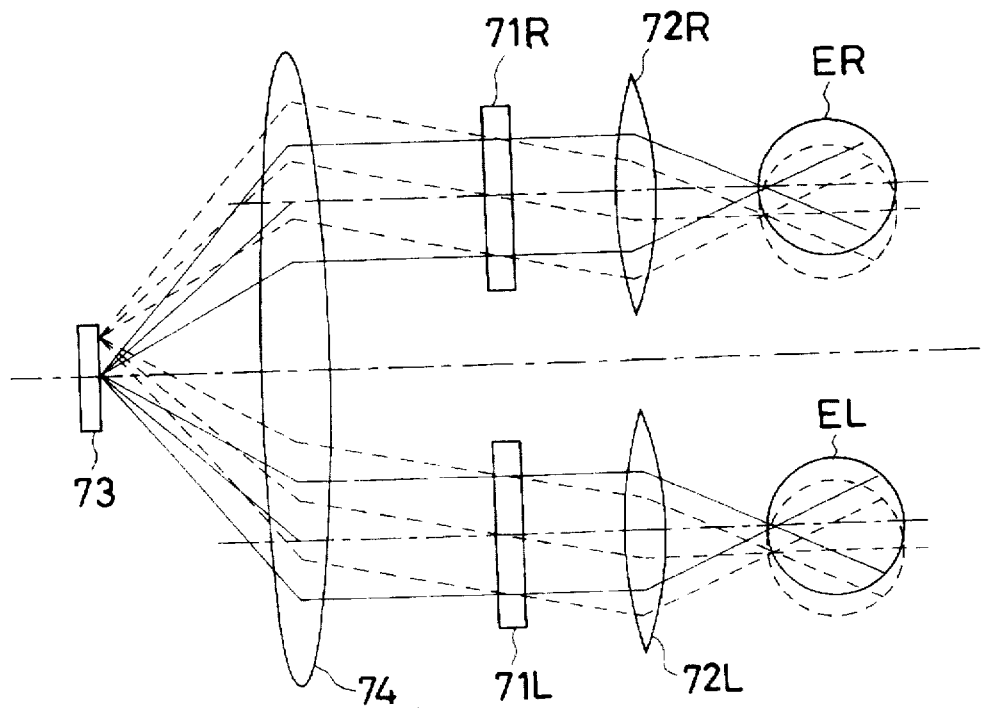
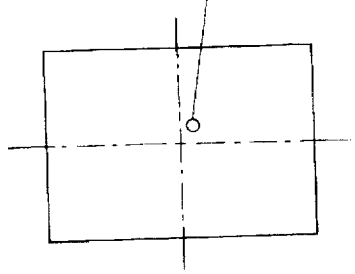
Common conjugate position to pupils of left and right eyeball
Distance between eyes is adjusted
FIG.19 (a)
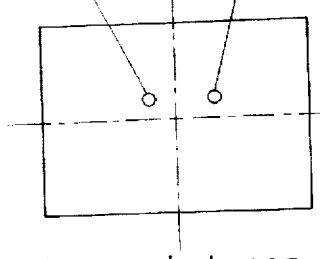
Conjugate position to pupil of right eyeball
Conjugate position to pupil of left eyeball
Distance between eyes is not adjusted
FIG.19 (b)

- ◉ Light-receiving device
- ● Point light source (OFF)
- ○ Point light source (ON)

HEAD-MOUNTED OR FACE-MOUNTED IMAGE DISPLAY APPARATUS WITH AN INCREASED EXIT PUPIL

BACKGROUND OF THE INVENTION

The present invention relates to an image display apparatus and, more particularly, to a head- or face-mounted image display apparatus which can be mounted on the observer's head or face so as to enable the observer to view an image displayed on an image display device of the apparatus.

Conventional eyeball projection type head-mounted image display apparatuses employ optical systems such as those shown in FIGS. 31 and 32. In the optical system shown in FIG. 31, a liquid crystal display device (LCD) 1 is illuminated by a backlight 2, and an image of the LCD 1 is formed on a retina 6 in an observer's eyeball 4 through an ocular lens 3 and a crystalline lens 5 in the eyeball 4.

In the optical system shown in FIG. 32, which is disclosed in Japanese Patent Application Laid-Open (KOKAI) No. 02-136818, an LCD 12 is illuminated by a point light source 11, and an image of the LCD 12 is projected on a retina 16 in an observer's eyeball 14 through an ocular lens 13 and a crystalline lens 15 in the eyeball 14. In this case, since the image of the point light source 11 is formed on the pupil of the eyeball 14, the observer can view the image of the LCD 12 irrespective of his or her visual acuity. Accordingly, no diopter correction is needed, and even when the observer is astigmatic, no correction is needed.

In the optical system as shown in FIG. 31, however, if the exit pupil of the projection optical system (ocular lens) is small, it may be necessary to adjust the distance between the observer's eyes, or when the observer looks at an edge of the image field, the observer's pupil may become misaligned with the bundle of image-forming rays, causing the displayed image to become invisible.

In view of the problem associated with the conventional technique, the present inventor conducted exhaustive studies, and has found that the above-described problem can be effectively solved by increasing the diameter a of the exit pupil of the projection optical system, as shown in FIGS. 33(a) and 33(b). More specifically, in the case of FIG. 33(a), even if the position of the observer's eyeball E deviates from the center of the ray bundle, the observer's pupil will not come out of the ray bundle, and it is not particularly necessary to adjust the distance between the observer's eyes. In the case of FIG. 33(b), even when the eyeball E rolls, the pupil will not come out of the ray bundle, and there is no likelihood that the displayed image will become invisible when the observer looks at an edge of the image field.

However, if the diameter of the exit pupil of the projection optical system is increased as described above, it becomes difficult to correct aberrations produced in the projection optical system. Accordingly, the arrangement of the optical system has to become complicated and large in size.

Further, since the diopter is different for different observers, the projection optical system needs a diopter correcting mechanism, thus giving rise to a new problem.

In the optical system as shown in FIG. 32, the ray bundle must be coincident with the observer's pupil, and the diameter of the ray bundle is exceedingly small. Therefore, adjustment is needed for this purpose. When the observer looks at an edge of the image field, the observer's pupil may come out of the ray bundle, causing the displayed image to become invisible.

SUMMARY OF THE INVENTION

An object of the present invention is to provide an image display apparatus which is designed so that a bundle of rays from an image display device which is to be projected into an observer's eyeball always passes through the observer's pupil, thereby enabling a displayed image to be favorably observed.

The present invention provides an image display apparatus which includes an image display device, a device for illuminating the image display device, a device for projecting a bundle of rays from the image display device illuminated by the illuminating device into an observer's eyeball, a device for detecting a positional relationship between the observer's eyeball and the ray bundle which is to be projected into the observer's eyeball, and a device for moving the ray bundle which is to be projected into the observer's eyeball according to the positional relationship detected by the positional relationship detecting device.

It is preferable to use a point light source as the illuminating device and to dispose the projecting device so that an image of the point light source is formed on an observer's pupil, from the viewpoint of enabling the displayed image to be observed irrespective of the observer's visual acuity. In this case, the diameter of the ray bundle which passes through the pupil becomes exceedingly small. Therefore, the image display apparatus of the present invention is even more useful because it can automatically adjust the positional relationship between the observer's eyeball and the ray bundle from the image display device which is to be projected into the eyeball.

Further, if the ray bundle moving device is arranged to move the above-described point light source, the moving part of the apparatus reduces in size. Consequently, it is possible to reduce the size of an actuator used in the image display apparatus of the present invention. Thus, the overall size of the apparatus can be favorably reduced.

The image display apparatus of the present invention may include an image display device, a device for illuminating the image display device, a device for projecting a bundle of rays from the image display device illuminated by the illuminating device into an observer's eyeball, a device for detecting the pupil position of the observer's eyeball, and a device for moving the ray bundle which is to be projected into the observer's eyeball according to the pupil position detected by the pupil position detecting device.

Further, the image display apparatus of the present invention may include an image display device, a device for illuminating the image display device, a device for projecting a bundle of rays from the image display device illuminated by the illuminating device into an observer's eyeball, and a device for vertically and horizontally moving the ray bundle which is to be projected into the observer's eyeball.

In addition, the present invention provides an image display apparatus which includes an image display device, a projection optical system for projecting an image of the image display device into an observer's eyeball, a light source for illuminating the image display device, and an illumination optical system for leading a bundle of rays emitted from the light source to the image display device, wherein the light source has a plurality of point light sources arranged on a plane, and is disposed at a position approximately conjugate to the pupil position of the observer's eyeball with respect to the illumination and projection optical systems.

In this case, the light source may be disposed in the vicinity of the back focal point of the illumination optical system.

Further, the image display apparatus may include a pair of left and right image display devices, a pair of left and right projection optical systems for projecting images of the left and right image display devices into observer's left and right eyeballs, a light source which is disposed on an axis lying at a position equidistant from the optical axes of the left and right projection optical systems to illuminate the left and right image display devices, and an illumination optical system for leading a bundle of rays emitted from the light source to the left and right image display devices.

It is preferable that the image display apparatus should have a device for detecting the pupil position of the observer's eyeball, and that, among the point light sources arranged on a plane, only a point light source which is at or near a position conjugate to the pupil of the observer's eyeball should be turned on.

According to the first-mentioned image display apparatus an embodiment the present invention, the positional relationship between the observer's eyeball and the ray bundle from the image display device illuminated by the illuminating device, which is to be projected into the observer's eyeball, is detected by the positional relationship detecting device. If the ray bundle is not coincident with the pupil of the eyeball, the ray bundle moving device moves the ray bundle so that the ray bundle is projected into the observer's eyeball. Thus, since the positional relationship between the observer's eyeball and the ray bundle from the image display device is automatically adjusted so that the ray bundle is projected into the eyeball, the observer can view the image of the image display device without the need of manually adjusting the positional relationship between the observer's eyeball and the ray bundle from the image display device which is to be projected into the eyeball.

According to the second-mentioned image display apparatus of an embodiment of the present invention, the light source for illuminating the image display device has a plurality of point light sources arranged on a plane, and is disposed at a position approximately conjugate to the pupil position of the observer's eyeball with respect to the illumination and projection optical systems. Therefore, a point light source which is conjugate to the pupil of the observer's eyeball is selected from among the point light sources to turn on. Consequently, the ray bundle emanating from the image display device converges on one point in the pupil of the observer's eyeball. Accordingly, it is possible to observe a clear image independently of the diopter of the observer's eyeball (shortsightedness, farsightedness, or astigmatism). Further, since a point light source which is conjugate to the pupil position of the observer's eyeball is selected to turn on according to the pupil position of each individual observer, no light source needs to be moved. Accordingly, the arrangement of the apparatus is prevented from becoming complicated.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 18 schematically shows the arrangement of a twelfth embodiment of the image display apparatus according to the present invention.

FIG. 19(a) shows a position which is conjugate to the pupils of the observer's left and right eyeballs when the distance between the observer's eyes is adjusted in the twelfth embodiment.

FIG. 19(b) shows positions which are conjugate to the pupils of the observer's left and right eyeballs when the distance between the observer's eyes is not adjusted in the twelfth embodiment.

FIG. 24 shows an example of a circuit for determining a point light source to be turned on.

DESCRIPTION OF THE PREFERRED EMBODIMENTS

Embodiments of the eyeball projection type image display apparatus according to the present invention will be described below in detail with reference to the accompanying drawings.

Figure 1:
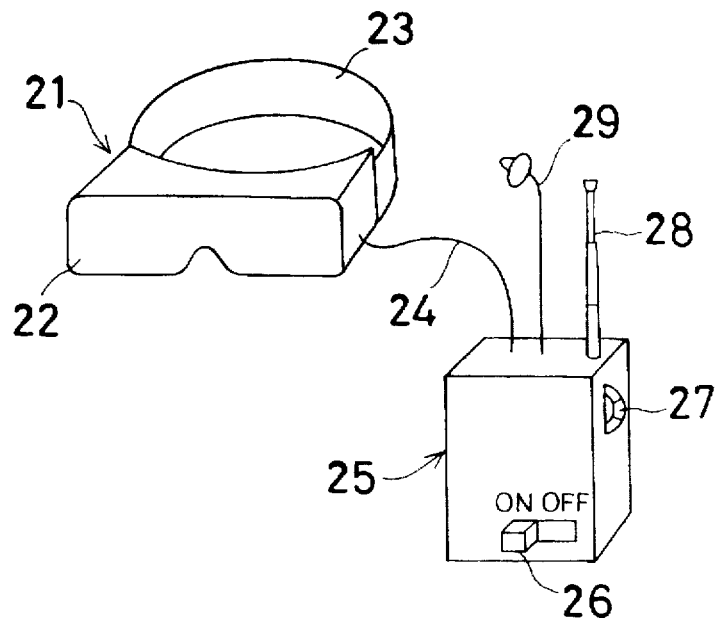
FIG. 1 shows the whole arrangement of a system in which an HMD that employs the image display apparatus of the present invention is connected to a television tuner.

FIG. 1 shows the whole arrangement of a system in which a head-mounted display apparatus (hereinafter referred to as "HMD") that employs an eyeball projection type image display apparatus of the present invention, particularly an image display apparatus such as that shown in first to eighth embodiments (described later), is connected to a television tuner. An HMD 21 has a face-mounted unit 22, and a headband 23 for retaining the face-mounted unit 22 on the observer's head. The face-mounted unit 22 has the following components (not shown): an image display device; a light source for illuminating the image display device; an ocular lens system for projecting a bundle of rays from the image display device illuminated by the light source into an observer's eyeball; a positional relationship detecting section having a taking lens and a CCD; and a ray bundle moving section for moving a ray bundle which is to be projected into the observer's eyeball according to the positional relationship between the observer's eyeball and the ray bundle which is to be projected into the observer's eyeball. The HMD 21 shown in FIG. 1 is connected to a television tuner 25 through a connecting cord 24. In this example, the television tuner 25 has an ON/OFF switch 26 for ON/OFF controlling the television tuner 25, a TV channel selecting knob 27 for tuning the television tuner 25 to a desired television channel, an antenna 28 for receiving a television signal, and an earphone 29 to which the sound signal in the television signal received by the antenna 28 is transmitted.

Figure 2:
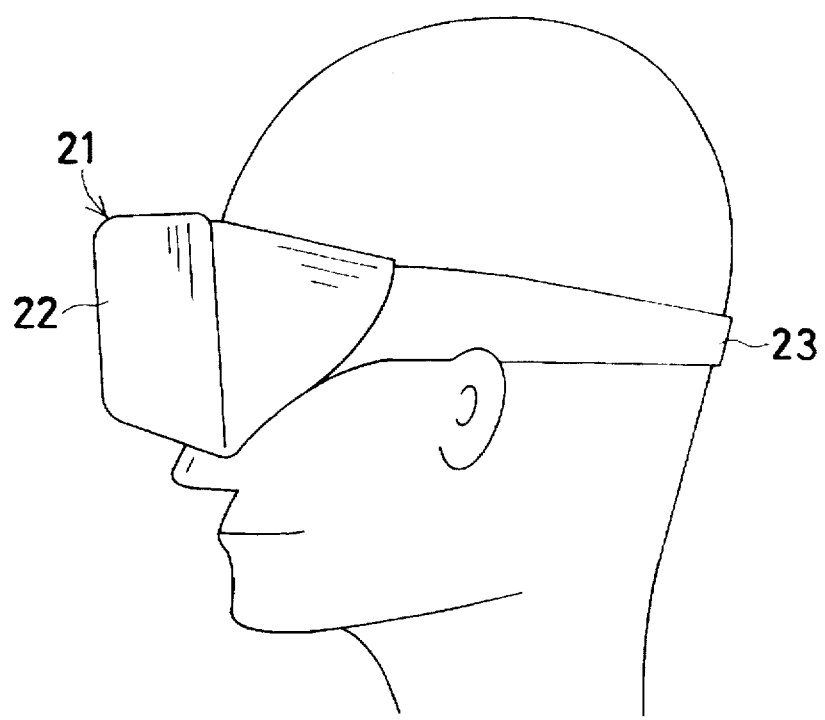
FIG. 2 shows a way in which the HMD is mounted on the observer's head.

FIG. 2 shows a way in which the HMD 21 is mounted on the observer's head. The method of using the HMD 21 will be explained below. The HMD 21 is retained on the observer's head by the headband 23, and the earphone 29 is fitted to an observer's ear. With the switch 26 turned on, the television tuner 25 is tuned to a desired television channel by using the TV channel selecting knob 27. Thus, the television channel to which the television tuner 25 has been tuned is received by the antenna 28. The sound signal in the received television signal is transmitted to the earphone 29, while the video signal in the television signal is transmitted to the HMD 21 through the connecting cord 24. The observer listens to the sound through the earphone 29, and observes the image displayed on the face-mounted unit 22.

Figure 3:
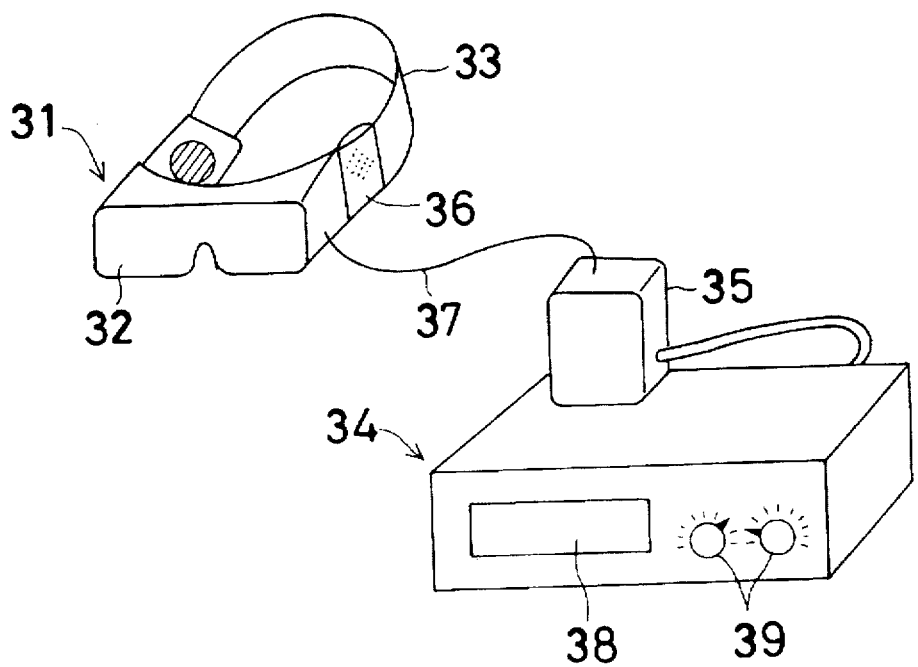
FIG. 3 shows the whole arrangement of a system in which an HMD that employs the image display apparatus of the present invention is connected to a video deck.

FIG. 3 shows the whole arrangement of a system in which an HMD that employs the eyeball projection type image display apparatus of the present invention is connected to a video deck. The HMD 31 has a face-mounted unit 32, a headband 33 for retaining the face-mounted unit 32 on the observer's head, and a headphone 36 to which a sound signal is transmitted from a video deck 34 through an image processing unit 35. The face-mounted unit 32 has the following components (not shown): an image display device; a light source for illuminating the image display device; an ocular lens system for projecting a bundle of rays from the image display device illuminated by the light source into an observer's eyeball; a positional relation detecting section having a taking lens and a CCD; and a ray bundle moving section for moving the ray bundle which is to be projected into the observer's eyeball according to the positional relationship between the observer's eyeball and the ray bundle which is to be projected into the observer's eyeball. In the arrangement shown in FIG. 3, the HMD 31 is connected to the image processing unit 35 of the video deck 34 through a connecting cord 37. In this example, the video deck 34 has a tape insertion part 38 into which a video tape is inserted, control knobs 39 for controlling the volume and quality of sound, and an image signal processing unit 35 for processing an image signal.

Since the method of using the HMD 31 is approximately similar to that in the case of FIG. 2, description thereof is omitted.

Figure 4:
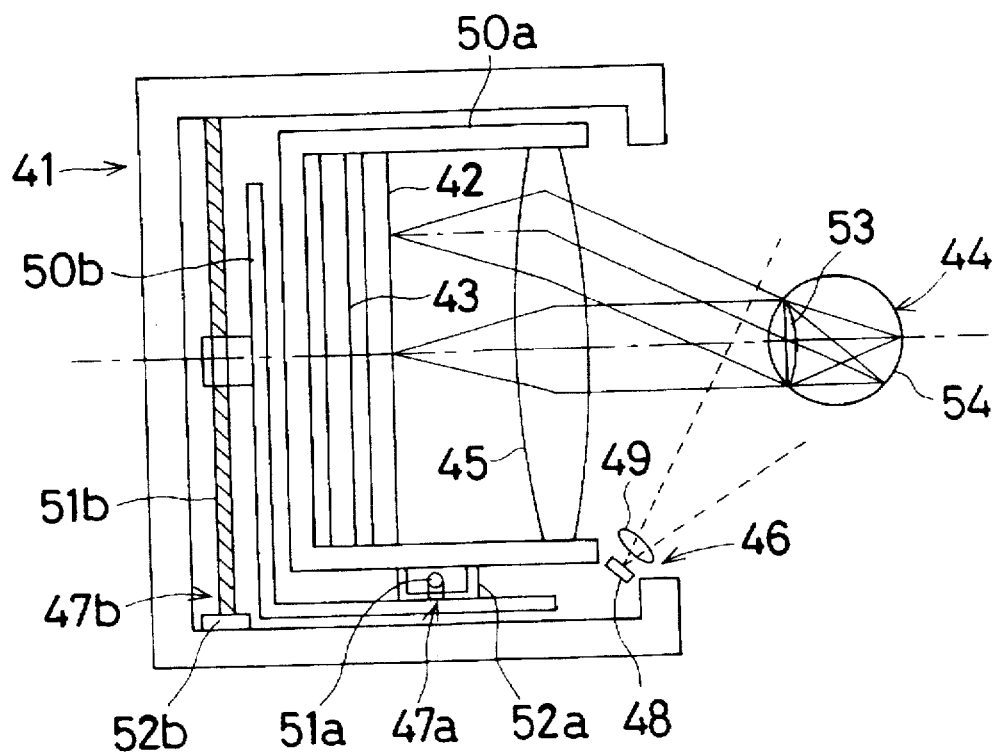
FIG. 4 schematically shows the arrangement of a first embodiment of the image display apparatus according to the present invention.

First Embodiment:

FIG. 4 schematically shows the arrangement of a first embodiment of the eyeball projection type image display apparatus according to the present invention. The eyeball projection type image display apparatus 41 has the following constituent elements: an LCD 42; a backlight 43 which serves as a diffusion light source to illuminate the LCD 42; an ocular lens 45 for projecting a bundle of rays from the LCD 42 illuminated by the backlight 43 into an observer's eyeball 44; a positional relationship detecting section 46 for detecting the positional relationship between the eyeball 44 and the ray bundle which is to be projected into the eyeball 44; and ray bundle moving sections 47a and 47b for moving the ray bundle which is to be projected into the eyeball 44 according to the positional relationship detected by the positional relationship detecting section 46. The positional relationship detecting section 46 has a combination of a two-dimensional CCD 48 and a taking lens 49 for observing the pupil of the eyeball 44 and its vicinities. The ray bundle moving section 47a has a combination of a ball screw 51a and a motor 52a to move a first support 50a for supporting the LCD 42, the backlight 43, and the ocular lens 45 in a direction perpendicular to the plane of the figure. The ray bundle moving section 47b has a combination of a ball screw 51b and a motor 52b to move a second support 50b for supporting the first support 50a and the ray bundle moving section 47a , which moves the first support 50a, in the vertical direction as viewed in the figure. Although in this embodiment the arrangement for only one of the observer's eyeballs is shown, it should be noted that the same arrangement is used for the other eyeball.

Figure 5:
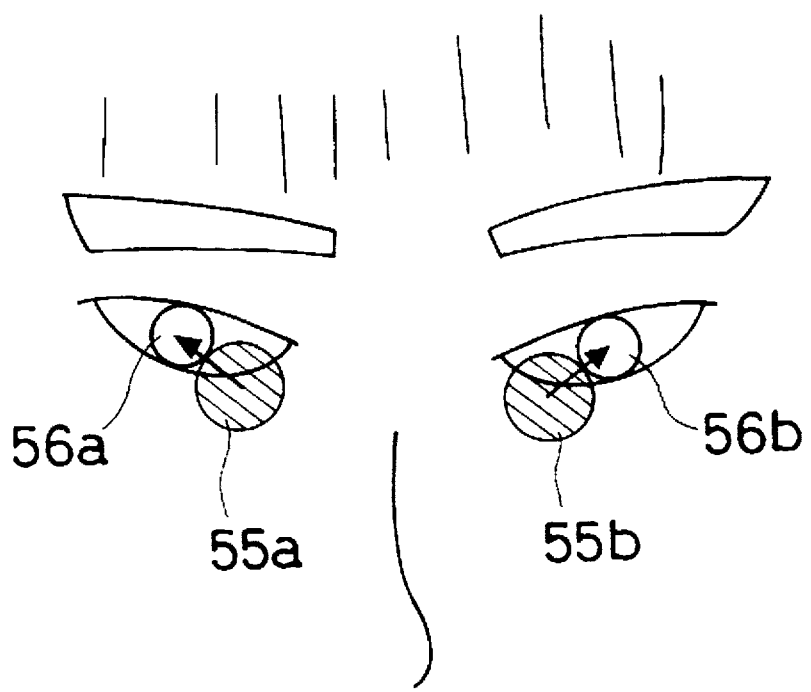
FIG. 5 shows conditions in which ray bundles which are projected into observer's eyeballs by an image display apparatus are not coincident with the observer's pupils.

The operation of this embodiment will be explained below. When a bundle of rays from the LCD 42, which is illuminated by the backlight 43, is being projected into the eyeball 44, the ray bundle passes through the ocular lens 45 and the lens 53 in the eyeball 44. As a result, the image of the LCD 42 is formed on the retina 54 in the eyeball 44. As shown in FIG. 5, when the ray bundle 55a is not coincident with the pupil 56a, the observer cannot see the image of the LCD 42 (see FIG. 4).

Figure 6:
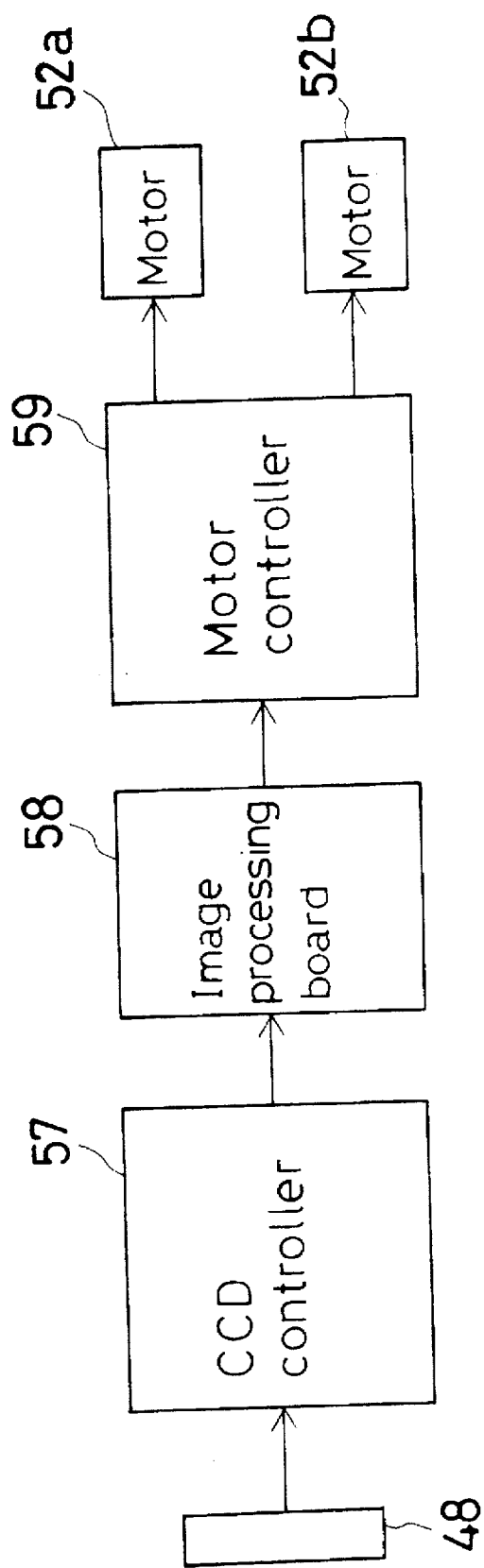
FIG. 6 is a block diagram showing a positional relationship detecting section and a ray bundle moving section in the first embodiment.

FIG. 6 is a block diagram showing the positional relationship detecting section and the ray bundle moving section in the first embodiment. The positional relationship detecting section 46 (see FIG. 4) observes the pupil 56a (see FIG. 5) of the eyeball 44 (see FIG. 4) and its vicinities under the control of a CCD controller 57, and where the ray bundle 55a (see FIG. 5) is being projected is detected by an image processing board 58. If it is detected that the ray bundle 55a is not coincident with the pupil 56a, the motors 52a and 52b are driven by a motor controller 59 to move the first support 50a and the second support 50b, that is, the LCD 42, the backlight 43, and the ocular lens 45, so that the ray bundle 55a passes through the pupil 56a.

A similar operation is also carried out when the ray bundle 55b is not coincident with the pupil 56b.

According to this embodiment, when the user of the eyeball projection type image display apparatus changes from one to another, the positional relationship between the new user's eyeball and the ray bundle which is to be projected into the eyeball is detected when the image display apparatus is mounted on the new user's head, and the positional relationship is automatically adjusted so that the ray bundle passes through the pupil of the user's eyeball. Therefore, the user can observe the image of the image display device without manually adjusting the positional relationship between his or her eyeball and the ray bundle which is to be projected thereinto. Further, since it is possible to use a projection optical system in which the beam diameter is advantageously small, the design of the optical system is facilitated.

Figure 7:
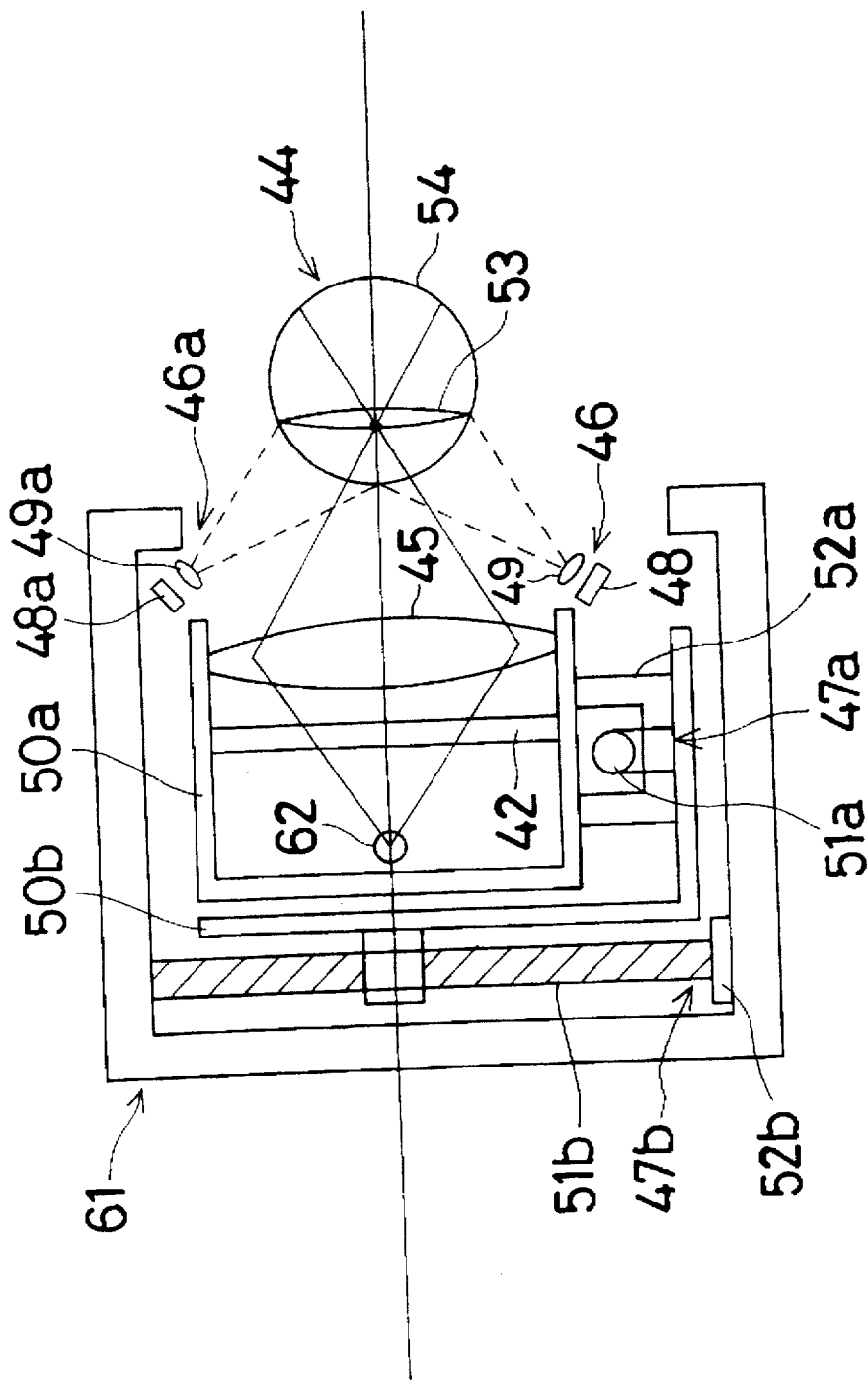
FIG. 7 schematically shows the arrangement of a second embodiment of the image display apparatus according to the present invention.

Second Embodiment:

FIG. 7 schematically shows the arrangement of a second embodiment of the eyeball projection type image display apparatus according to the present invention. Although in this embodiment also the arrangement for only one of the observer's eyeballs is shown, it should be noted that the same arrangement is used for the other eyeball. The arrangement of the eyeball projection type image display apparatus 61 is the same as that of the first embodiment except that a point light source 62 is provided in place of the backlight 43 (see FIG. 4), and that another positional relationship detecting section 46a having a CCD 48a and a taking lens 49a is added in order to increase the degree of detecting accuracy. In this embodiment, further, the image of the LCD 42 which is illuminated by the point light source 62 is formed on the observer's pupil 56a (see FIG. 5) through the ocular lens 45, and projected directly on the retina 54.

Figure 8:
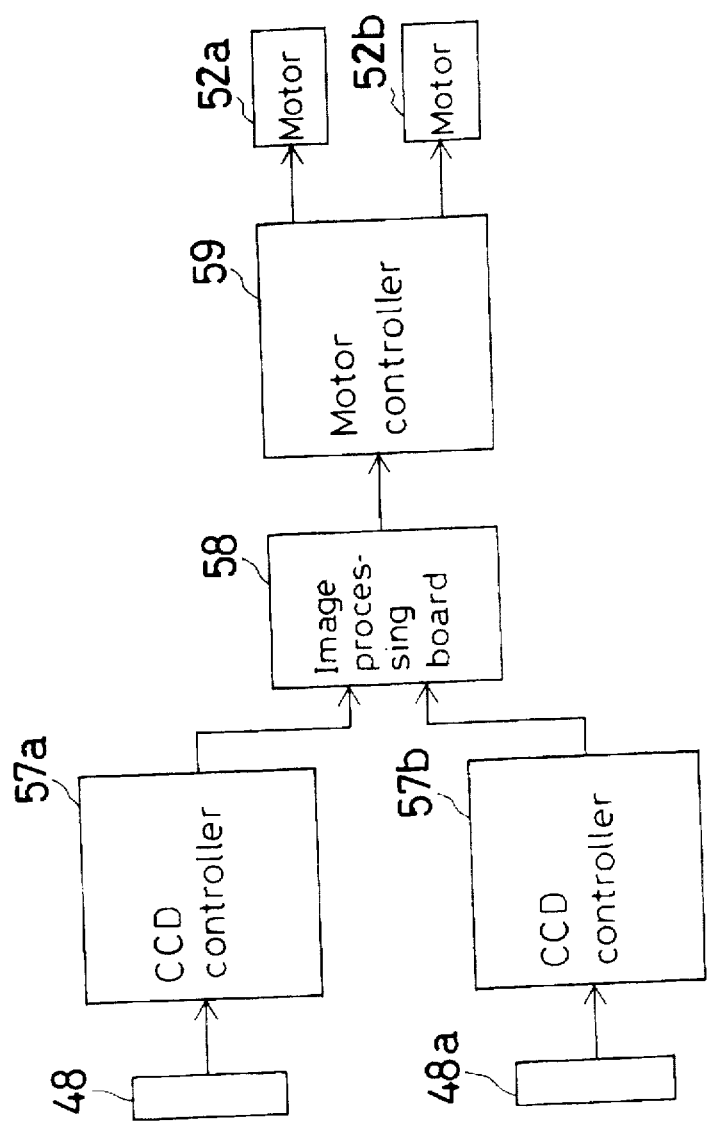
FIG. 8 is a block diagram showing a positional relationship detecting section and a ray bundle moving section in the second embodiment.

The operation of this embodiment will be explained below. FIG. 8 is a block diagram showing the positional relationship detecting section and the ray bundle moving section in the second embodiment. The positional relationship detecting sections 46 and 46a (see FIG. 7) observe the pupil 56a (see FIG. 5) of the eyeball 44 (see FIG. 7) and its vicinities under the control of CCD controllers 57a and 57b, and where the ray bundle 55a (see FIG. 5) is being projected is detected by an image processing board 58. If it is detected that the ray bundle 55a is not coincident with the pupil 56a, the motors 52a and 52b are driven by a motor controller 59 to move the first support 50a and the second support 50b, that is, the LCD 42, the backlight 43, and the ocular lens 45, so that the image of the LCD 42, which is illuminated by the point light source 62, is projected directly on the retina 54 through the ocular lens 45. A similar operation is also carried out when the ray bundle 55b is not coincident with the pupil 56b.

The other operation is almost the same as that in the first embodiment.

In this embodiment also, the user can observe the image of the image display device without manually adjusting the positional relationship between his or her eyeball and the ray bundle which is to be projected thereinto. In this embodiment, further, since the image of the point light source is formed on the observer's pupil, the observer can see the image of the LCD irrespective of his or her visual acuity. It should be noted that, since the diameter of the ray bundle passing through the pupil is small, the eyeball projection type image display apparatus of the present invention functions very effectively.

Figure 9:
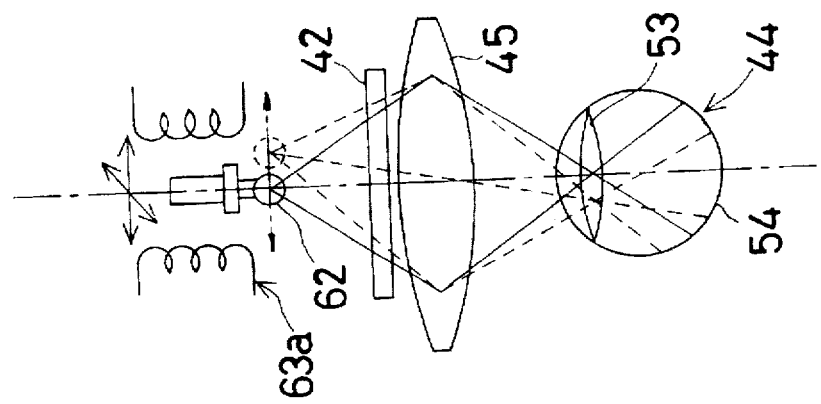
FIG. 9 schematically shows the arrangement of a third embodiment of the image display apparatus according to the present invention.

Third Embodiment:

FIG. 9 schematically shows the arrangement of a third embodiment of the eyeball projection type image display apparatus according to the present invention. The arrangement and operation of this embodiment are almost the same as those of the first and second embodiments except that the point light source 62 is moved by using an actuator 63a , thereby moving the ray bundle 55a (see FIG. 5) which is to be projected into the eyeball 44.

According to this embodiment, the following advantageous effects can be obtained in addition to those of the first and second embodiments: Since the size of the ray bundle moving section is reduced, it is possible to use an actuator of small torque such as that used for a pick-up. Accordingly, a small-sized actuator can be used, and thus the overall size of the apparatus can be reduced.

Figure 10:
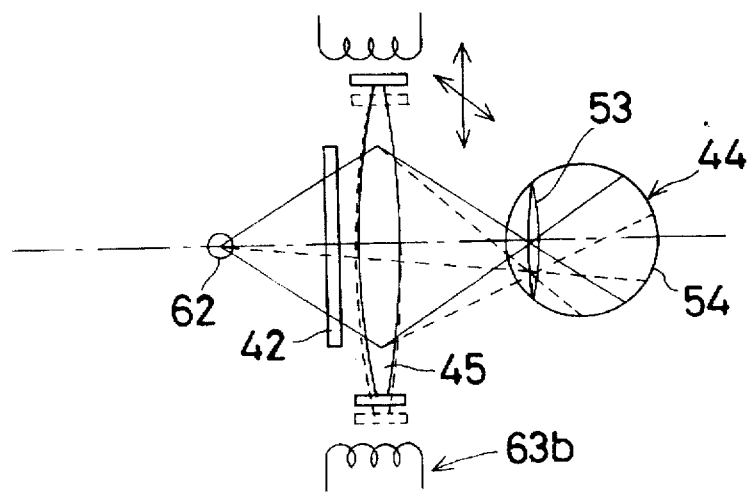
FIG. 10 schematically shows the arrangement of a fourth embodiment of the image display apparatus according to the present invention.

Fourth Embodiment:

FIG. 10 schematically shows the arrangement of a fourth embodiment of the eyeball projection type image display apparatus according to the present invention. The arrangement and operation of this embodiment are approximately the same as those of the first and second embodiments except that the ocular lens 45 is moved by using an actuator 63b , thereby moving the ray bundle 55a (see FIG. 5) which is to be projected into the eyeball 44.

According to this embodiment, the following advantageous effects can be obtained in addition to those of the first and second embodiments in the same way as in the third embodiment: Since the size of the ray bundle moving section is reduced, it is possible to use an actuator of small torque such as that used for a pick-up. Accordingly, a small-sized actuator can be used, and thus the overall size of the apparatus can be reduced.

Figure 11:
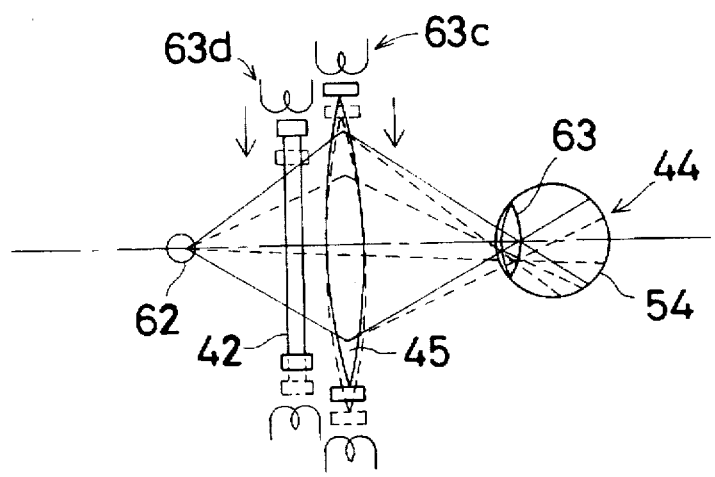
FIG. 11 schematically shows the arrangement of a fifth embodiment of the image display apparatus according to the present invention.

Fifth Embodiment:

FIG. 11 schematically shows the arrangement of a fifth embodiment of the eyeball projection type image display apparatus according to the present invention. The arrangement and operation of this embodiment are approximately the same as those of the first and second embodiments except that the LCD 42 and the ocular lens 45 are respectively moved by using actuators 63c and 63d, thereby moving the ray bundle which is to be projected into the eyeball 44.

According to this embodiment, the following advantageous effects can be obtained in addition to those of the first and second embodiments in the same way as in the third and fourth embodiments: Since the size of the ray bundle moving section is reduced, it is possible to use an actuator of small torque such as that used for a pick-up. Accordingly, a small-sized actuator can be used, and thus the overall size of the apparatus can be reduced.

In the case of the third embodiment, the point light source 62 is moved. Therefore, the range over which the LCD 42 is illuminated by the point light source 62 shifts, and the observable range shifts correspondingly. In the case of the fourth embodiment, the ocular lens 45 is moved. Therefore, the observable range does not shift, but the image projected on the retina 54 moves in accordance with the movement of the ocular lens 45. In this embodiment, however, these unfavorable phenomena can be avoided by moving the LCD 42 in the same direction as the ocular lens 45.

Figure 12:
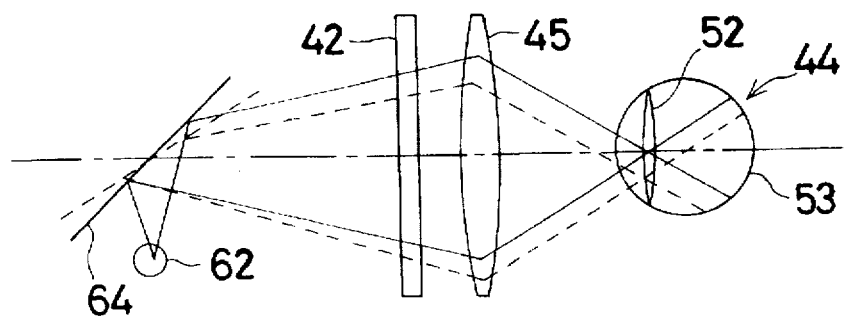
FIG. 12 schematically shows the arrangement of a sixth embodiment of the image display apparatus according to the present invention.

Sixth Embodiment:

FIG. 12 schematically shows the arrangement of a sixth embodiment of the eyeball projection type image display apparatus according to the present invention. The arrangement and operation of this embodiment are almost the same as those of the first and second embodiments except that a movable mirror 64 for turning back a bundle of rays from the point light source 62 is provided, and the ray bundle which is to be projected into the eyeball 44 is moved by moving the movable mirror 64.

According to this embodiment, the following advantageous effect can be obtained in addition to those of the first to third embodiments: The degree of freedom with which the constituent elements of the apparatus can be arranged is increased by arranging the optical system so that the ray bundle from the point light source 62 is turned back by the movable mirror 64.

Figure 13:
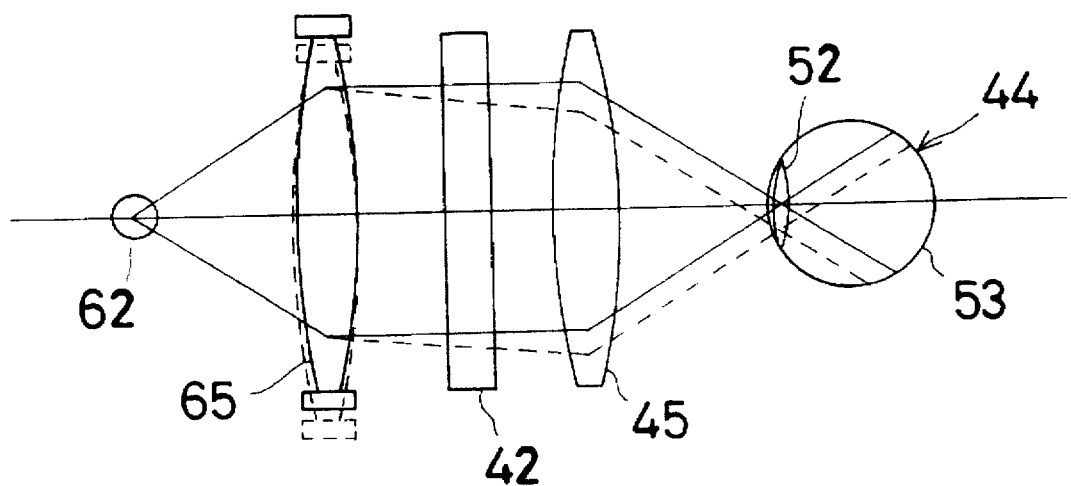
FIG. 13 schematically shows the arrangement of a seventh embodiment of the image display apparatus according to the present invention.

Seventh Embodiment:

FIG. 13 schematically shows the arrangement of a seventh embodiment of the eyeball projection type image display apparatus according to the present invention. The arrangement and operation of this embodiment are almost the same as those of the first and second embodiments except that a collimator lens 65 is disposed between the point light source 62 and the LCD 42, and the ray bundle which is to be projected into the eyeball 44 is moved by moving the collimator lens 65.

According to this embodiment, the following advantageous effect can be obtained in addition to those of the first to third embodiments: The LCD 42 can be illuminated with parallel rays of light by providing the collimator lens 65. Accordingly, it is possible to minimize the influence of the viewing angle characteristics of the LCD 42.

Figure 14:
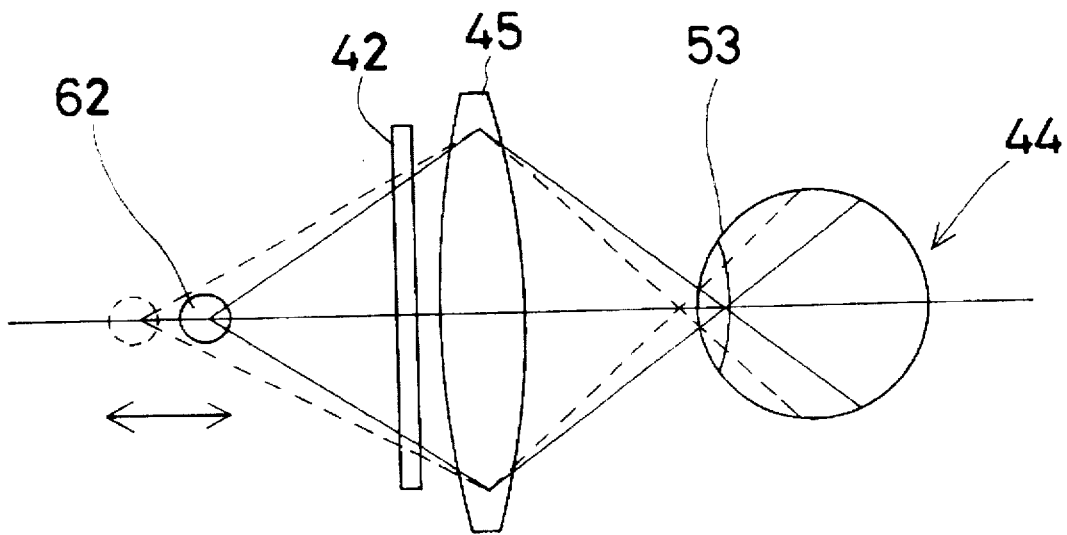
FIG. 14 schematically shows the arrangement of an eighth embodiment of the image display apparatus according to the present invention.

Eighth Embodiment:

FIG. 14 schematically shows the arrangement of an eighth embodiment of the eyeball projection type image display apparatus according to the present invention. In this embodiment, the apparatus is arranged such that the point light source 62 can be moved along the optical axis by the operation of an actuator (not shown), e.g., a PZT, a coil, etc. Thus, in the same way as in the above-described embodiments, the pupil 56a (see FIG. 5) of the eyeball 44 (see FIG. 4) and its vicinities are observed with an imaging device, e.g., a CCD, and the point light source 62 is moved along the optical axis according to the condition of the ray bundle thus observed so that the ray bundle is the narrowest at the observer's pupil. By doing so, the image of the point light source 62 can always be formed on the pupil plane. Therefore, it is possible to observe the displayed image independently of the human visual acuity.

If the apparatus is arranged such that the point light source 62 can be moved along the optical axis by manual operation, the eye relief can be adjusted by moving the point light source 62 after the user has mounted the HMD on his or her head.

Although in the third to eighth embodiments also the arrangement and operation of a system for only one of the observer's eyeballs is shown, it should be noted that the arrangement and operation of a system for the other eyeball are the same as those described above.

It should be noted that the present invention is not necessarily limited to the above-described embodiments, and that various changes and modifications may be imparted thereto. For example, although in the first to eighth embodiments an ocular lens is used as an ocular optical system, the same effect can be obtained by using a concave mirror, a prism or other optical system.

Incidentally, the above-described first to eighth embodiments require a mechanical driving device such as a motor and hence becomes complicated in arrangement. Moreover, when the eyeball moves rapidly, the movement of the point light source may fail to follow the movement of the eyeball, causing the displayed image to temporarily become invisible. The following ninth to seventeenth embodiments propose image display apparatuses which solve the above-described problems, and which are further improved in performance. It should be noted that in the following description, "front side" means the side which is closer to the eyeball, and "rear side" means the side which is closer to the light source, unless otherwise stated.

Figure 15:
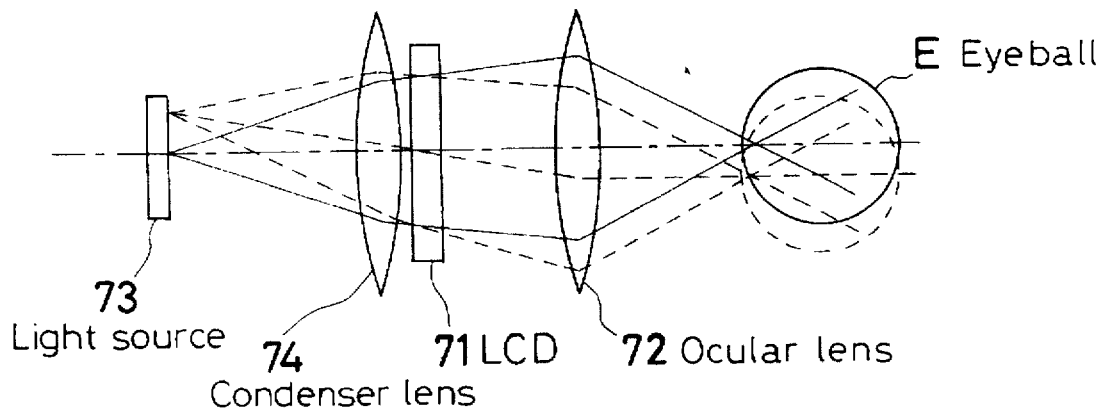
FIG. 15 schematically shows the arrangement of a ninth embodiment of the image display apparatus according to the present invention.

Ninth Embodiment:

FIG. 15 schematically shows the arrangement of a ninth embodiment of the image display apparatus according to the present invention. As illustrated in the FIG., the image display apparatus has a two-dimensional image display device (i.e., a liquid crystal display device (LCD) in this embodiment) 71, and a projection optical system (i.e., an ocular lens in this embodiment) 72 for projecting the image of the LCD 71 into an observer's eyeball E. The image display apparatus further has a light source 73 for illuminating the LCD 71, and an illumination optical system (i.e., a condenser lens in this embodiment) 74 for leading a bundle of rays emitted from the light source 73 to the LCD 71. The condenser lens 74 is disposed near the rear side of the LCD 71, and the pupil of the observer's eyeball E is disposed in the vicinity of the front focal point of the ocular lens 72.

The light source 73 is disposed so as to be approximately conjugate to the pupil of the observer's eyeball E with respect to the condenser lens 74 and the ocular lens 72.

The light source 73 is composed of a multiplicity of point light sources which are arranged on a plane. When one or some of the point light sources are selected to turn on, light emitted from the selected point light sources illuminates the LCD 71, and light emanating from the LCD 71 is made incident on the pupil of the observer's eyeball E by the ocular lens 72.

By virtue of the above-described arrangement, one or some point light sources which are approximately conjugate to the position of the pupil of the eyeball E are selected to turn on according to the pupil of each individual observer, thereby enabling the ray bundle to pass through the pupil at substantially one point. Accordingly, it is possible to observe a clear image independently of the diopter of the observer's eyeball E.

When the pupil of the observer's eyeball E is not coincident with the optical axis, or when the pupil is deviated from the optical axis by rotation of the eyeball E, one or some point light sources which are present at a position conjugate to the pupil position are selected to turn on, thereby eliminating the need of adjusting the axis of the optical system or the position of the light source.

The light source 73 may be formed by disposing a liquid crystal spatial modulator on the surface of a panel-shaped illumination source instead of using a multiplicity of point light sources arranged on a plane as described above. In this case, the liquid crystal modulator is made transparent at a position where the light source is desired to turn on, while the other portion of the liquid crystal modulator is placed in a light-blocking state, thereby obtaining the same effect as in a case where a point light source is turned on.

It should be noted that the number of point light sources arranged on a plane is preferably 3 or more, more preferably 6 or more. The larger the number of point light sources, the higher the degree of freedom.

Figure 16:
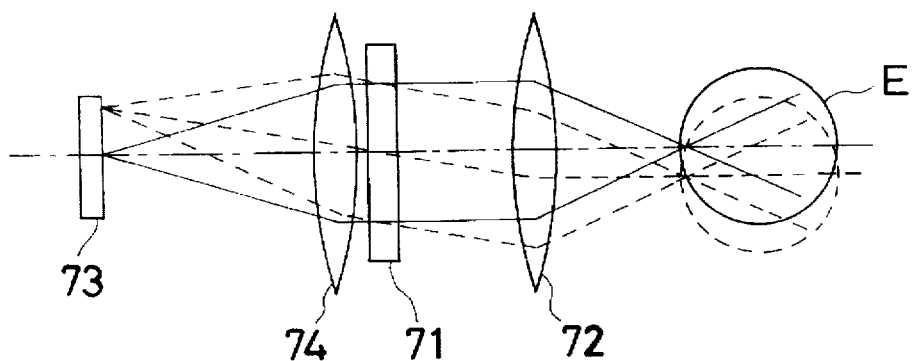
FIG. 16 schematically shows the arrangement of a tenth embodiment of the image display apparatus according to the present invention.

Tenth Embodiment:

FIG. 16 schematically shows the arrangement of a tenth embodiment of the image display apparatus according to the present invention. This embodiment adopts an arrangement similar to that of the ninth embodiment. In this embodiment, however, the light source 73 is disposed in the vicinity of the back focal point of the condenser lens 74, and the ocular lens 72 is disposed so that the LCD 71 lies at the back focal point of the ocular lens 72.

With the above-described arrangement, the light source 73 is approximately conjugate to the pupil of the observer's eyeball E. Thus, when one or some of the point light sources are turned on, illuminating light is collimated by the condenser lens 74. Consequently, the LCD 71 is illuminated with parallel rays, and light emanating from the LCD 71 is made incident on the pupil of the observer's eyeball E by the ocular lens 72. Thus, it is possible to reduce the influence of the viewing angle characteristics of the LCD 71.

Figure 17:
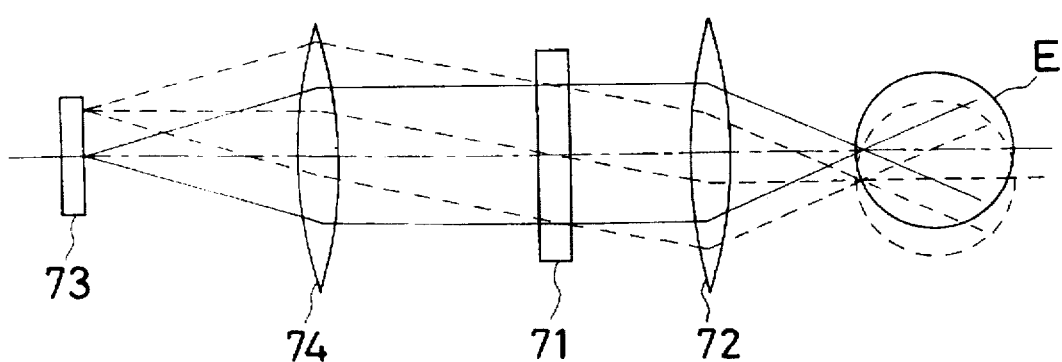
FIG. 17 schematically shows the arrangement of an eleventh embodiment of the image display apparatus according to the present invention.

Eleventh Embodiment:

FIG. 17 schematically shows the arrangement of an eleventh embodiment of the image display apparatus according to the present invention. This embodiment adopts an arrangement similar to that of the tenth embodiment. In this embodiment, however, the LCD 71 and the condenser lens 74 are disposed so that the LCD 71 lies at the front focal point of the condenser lens 74. Thus, even when the luminance of light rays emitted from the light source 73 has an angle distribution, the exit angle of light illuminating one point on the LCD 71 is the same for all the point light sources. Accordingly, even when point light sources to be turned on change from one to another, there is no change in brightness.

Twelfth Embodiment:

FIG. 18 schematically shows the arrangement of a twelfth embodiment of the image display apparatus according to the present invention. In this embodiment, the optical system as shown in FIG. 16 or 17 is provided for each of the observer's left and right eyes, with the light source and the illumination optical system made common to the left and right optical systems. As shown in FIG. 18, the image display apparatus of this embodiment has a pair of left and right LCDs 71L and 71R, and a pair of left and right ocular lenses 72L and 72R for projecting the respective images of the LCDs 71L and 71R into the observer's left and right eyeballs EL and ER.

Further, the image display apparatus has a light source 73 which is disposed at a central point which is equidistant from the optical axes of the left and right LCDs 71L and 71R and ocular lenses 72L and 72R, and which is common to the left and right optical systems, and a condenser lens 74 which is also common to the left and right optical systems. The light source 73 is disposed in the vicinity of the back focal point of the condenser lens 74, and the pupils of the observer's eyeballs EL and ER are disposed at the respective front focal points of the ocular lenses 72L and 72R. The light source 73 is composed of a multiplicity of point light sources which are arranged on a plane, as described above. With this arrangement, the light source 73 is approximately conjugate to both the pupils of the observer's eyeballs EL and ER.

In the ninth to eleventh embodiments, a light source and an illumination optical system are needed for each of the observer's left and right eyes, whereas, in this embodiment, the light source and the illumination optical system are common to the observer's left and right eyes. Accordingly, it is possible to minimize the number of constituent elements and to reduce the overall weight of the apparatus. Further, once the distance between the observer's left and right eyes is adjusted, since the left and right eyeballs EL and ER rotate in the same direction, a point light source or group of point light sources to be turned on may always be common to the left and right optical systems, as shown in FIG. 19(a). In a case where the distance between the observer's left and right eyes is not adjusted, as shown in FIG. 19(b), at least two point light sources which are conjugate to the respective pupils of the left and right eyeballs EL and ER should be turned on so that bundles of rays from the point light sources reach the left and right eyes EL and ER, respectively.

Figure 20:
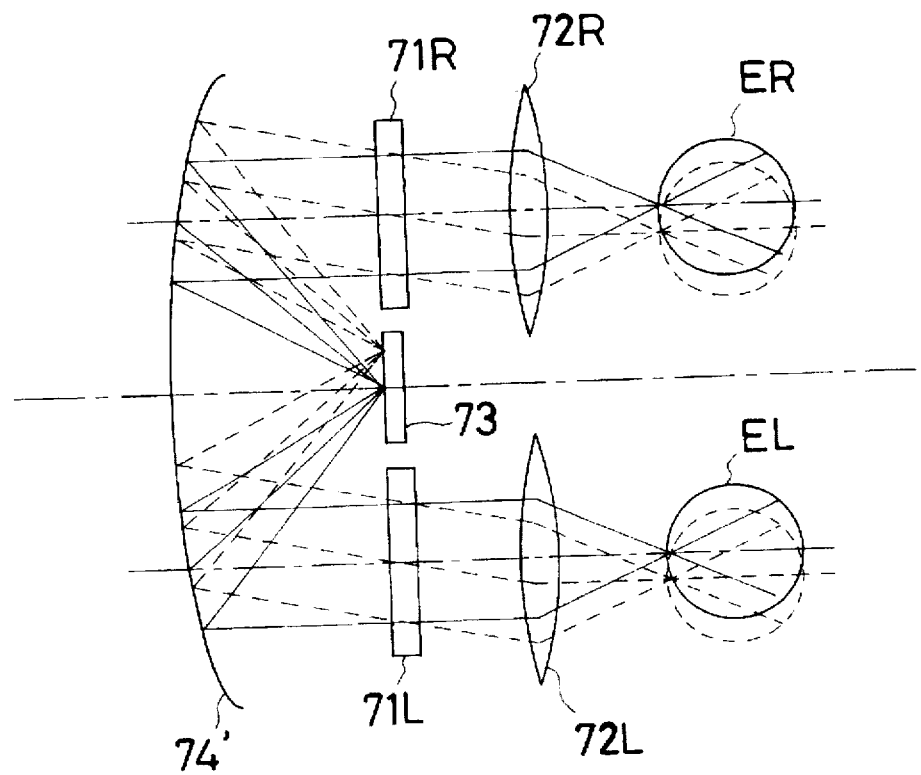
FIG. 20 schematically shows the arrangement of a thirteenth embodiment of the image display apparatus according to the present invention.

Thirteenth Embodiment:

FIG. 20 schematically shows the arrangement of a thirteenth embodiment of the image display apparatus according to the present invention. In this embodiment, the illumination optical system in the twelfth embodiment is replaced by a common condenser reflecting mirror 74'. The use of the condenser reflecting mirror 74' as an illumination optical system makes it possible to reduce the size of the optical system.

Figure 21:
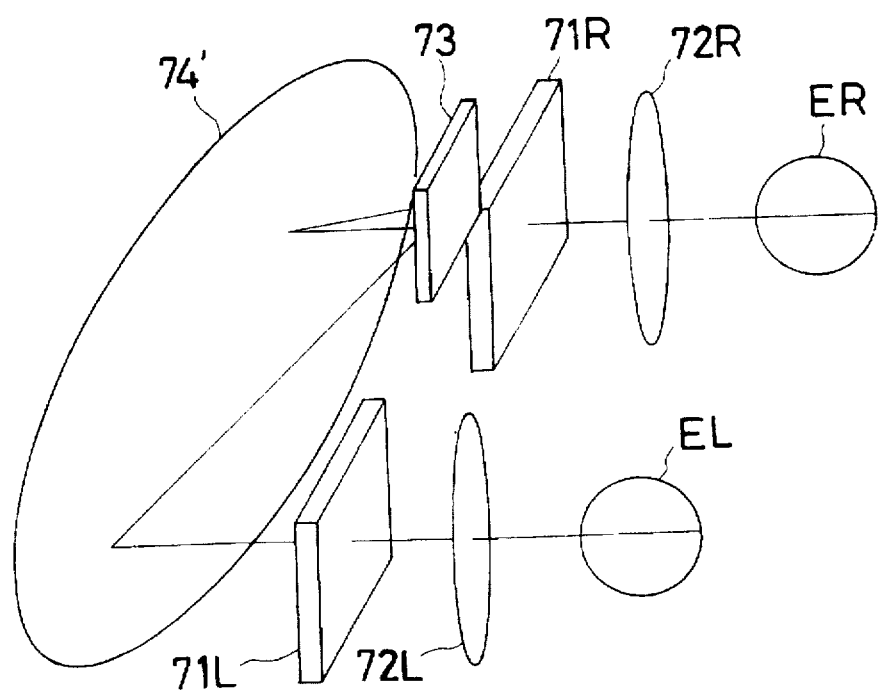
FIG. 21 is a perspective view showing a modification of the thirteenth embodiment.

The thirteenth embodiment may be modified as shown in the perspective view of FIG. 21. That is, the condenser reflecting mirror 74' may be decentered so that the optical axis of the light source 73 is formed at the upper side (or lower side) of the plane containing the optical axes of the left and right ocular lenses 72L and 72R. The arrangement of the modification gives freedom for the layout of the optical system.

Figure 22:
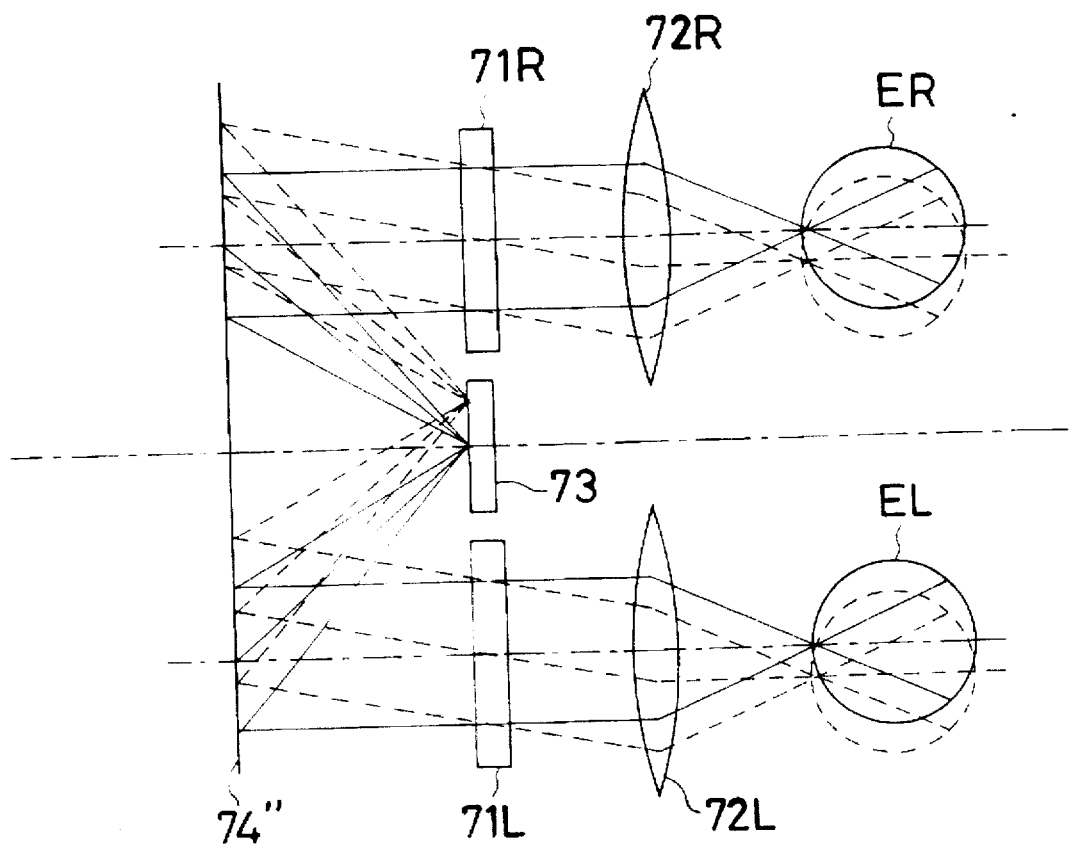
FIG. 22 schematically shows the arrangement of a fourteenth embodiment of the image display apparatus according to the present invention.

Fourteenth Embodiment:

FIG. 22 schematically shows the arrangement of a fourteenth embodiment of the image display apparatus according to the present invention. In this embodiment, a Fresnel condenser reflecting mirror or diffraction condenser optical device 74" is used as the condenser reflecting mirror 74' in the thirteenth embodiment, thereby achieving a reduction in the size of the optical system. If the condenser reflecting mirror 74' in the thirteenth embodiment is formed from a spherical surface, the pupil position is displaced in each direction of the observation image field by spherical and other aberrations of illuminating light. If the pupil position is displaced to such an extent that a problem arises, the condenser reflecting mirror 74' must be formed into an aspherical surface. In such a case, however, the production of the reflecting mirror becomes difficult. In contrast, the Fresnel condenser reflecting mirror or diffraction condenser optical device 74" can provide refractive power and aspherical effect with a planar configuration, and is easy to produce. Further, since the illumination optical system can be formed from a plane surface, the arrangement of this embodiment is useful for reduction in size of the apparatus.

Figure 23:
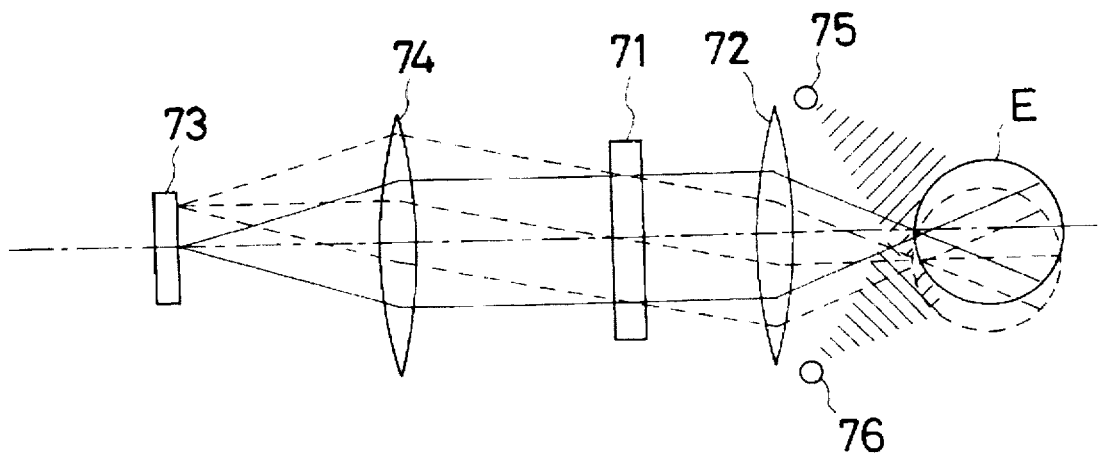
FIG. 23 schematically shows the arrangement of a fifteenth embodiment of the image display apparatus according to the present invention.

Fifteenth Embodiment:

FIG. 23 schematically shows the arrangement of a fifteenth embodiment of the image display apparatus according to the present invention. In this embodiment, a point light source selecting mechanism is added to the arrangement of any of the above-described ninth to fourteenth embodiments. That is, the point light source selecting mechanism includes an eyeball illuminating device 75, e.g., an infrared light-emitting device, which is disposed outside a ray bundle emanating from the ocular lens 72 (72L or 72R), an imaging device 76 serving as a pupil detecting device, and a circuit for determining one or some point light sources which are conjugate to the detected pupil position on the basis of information from the imaging device 76. Thus, one or some point light sources to be turned on can be automatically selected.

Figure 24:
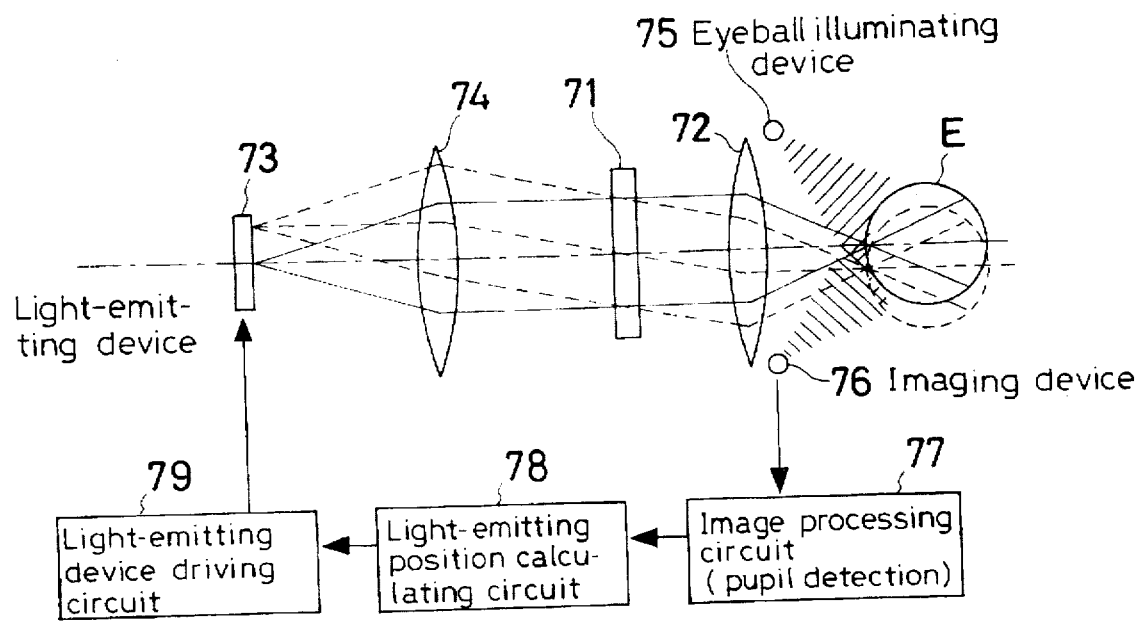

For example, as shown in FIG. 24, the eyeball illuminating device 75 and the imaging device 76 are disposed outside the ray bundle in the vicinity of the ocular lens 72 (72L or 72R), and the image of the eyeball E is taken. The eyeball image thus obtained is inputted to an image processing circuit 77 to detect the position of the pupil. Then, a light-emitting position calculating circuit 78 calculates the direction of the observer's line of sight from the pupil position information obtained in the image processing circuit 77, and further calculates a point light source corresponding to the direction of the observer's line of sight. Then, the light-emitting position calculating circuit 78 selects the point light source to be turned on, and a light-emitting device driving circuit 79 turns on the point light source (light-emitting device) selected from among those constituting the light source 73.

Figure 25:
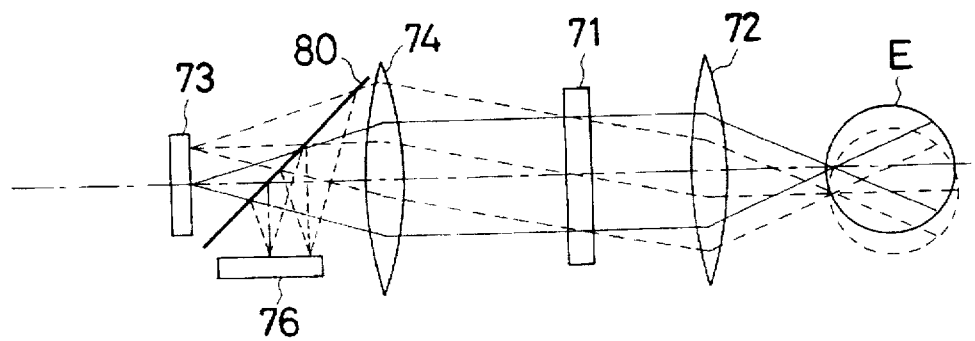
FIG. 25 schematically shows the arrangement of a sixteenth embodiment of the image display apparatus according to the present invention.

Sixteenth Embodiment:

FIG. 25 schematically shows the arrangement of a sixteenth embodiment of the image display apparatus according to the present invention. In this embodiment, a point light source selecting mechanism is added to the arrangement of any of the above-described ninth to fourteenth embodiments. That is, a half-mirror 80 is disposed between the light source 73 and the illumination optical system 74 (74' or 74"), and the imaging device 76 is disposed at a position conjugate to the surface of the eyeball E, which is defined by the ocular lens 72 and the illumination optical system 74, in the direction in which light rays returning from the eyeball E is reflected by the half-mirror 80, thereby detecting the position of the pupil. Further, a circuit for determining one or some point light sources which are conjugate to the detected pupil position is installed, thereby automatically selecting one or some point light sources to be turned on.

Figure 26:
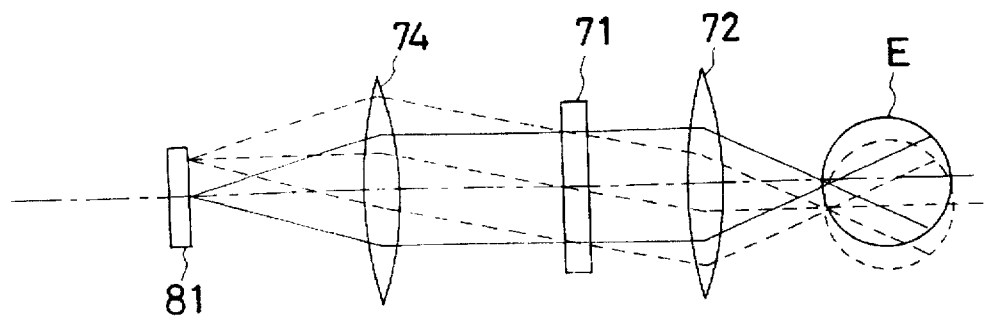
FIG. 26 schematically shows the arrangement of a seventeenth embodiment of the image display apparatus according to the present invention.
Figure 27:
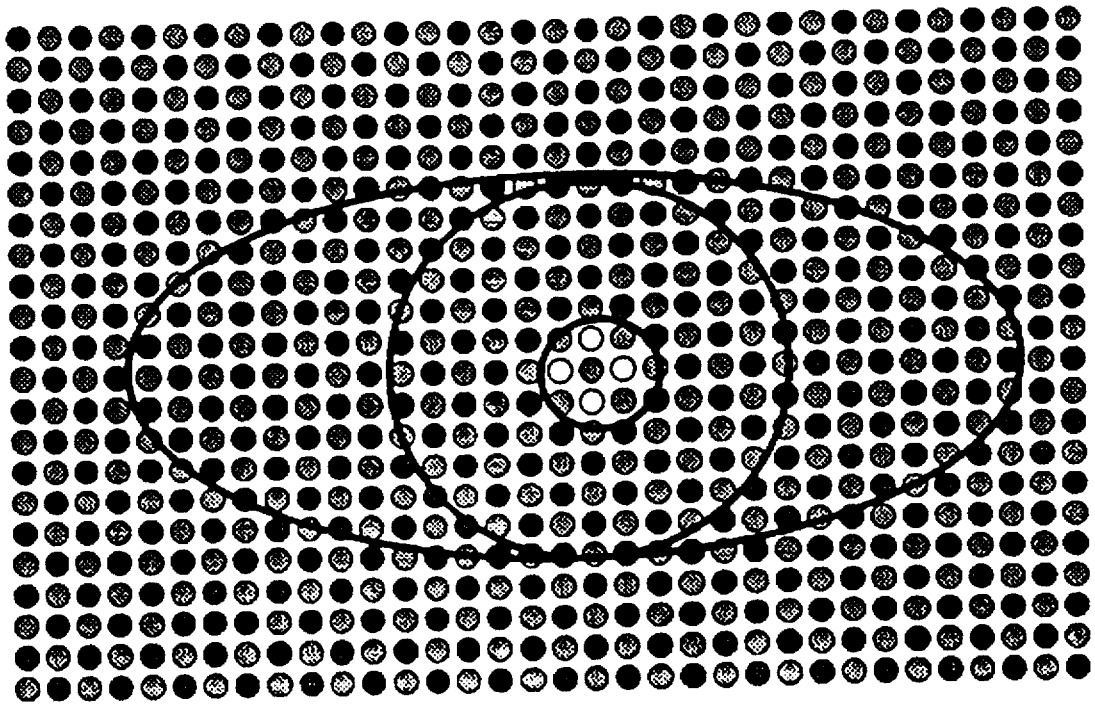
FIG. 27 is a front view of a device serving as both a light source and an imaging device, which is used in the seventeenth embodiment.

Seventeenth Embodiment:

FIG. 26 schematically shows the arrangement of a seventeenth embodiment of the image display apparatus according to the present invention. In this embodiment, the light source 73 in the ninth to fourteenth embodiments is replaced by a device 81 which serves as both a light source and an imaging device. That is, as shown in the front view of FIG. 27, the light source and imaging device 81 has light-receiving devices which are each disposed between each pair of adjacent point light sources. Since the position of the light source 73 is coincident with a position conjugate to the surface of the eyeball E, which is defined by the ocular lens 72 and the illumination optical system 74, the pupil position can be detected by the light source and imaging device 81, which is disposed at the light source position. Moreover, since in this case one or some point light sources to be turned on are present in the vicinity of light-receiving elements detecting the pupil position, the point light source determining circuit can be readily constructed. The arrangement of this embodiment enables the number of components to be reduced in comparison to the fifteenth and sixteenth embodiments.

Figure 28:
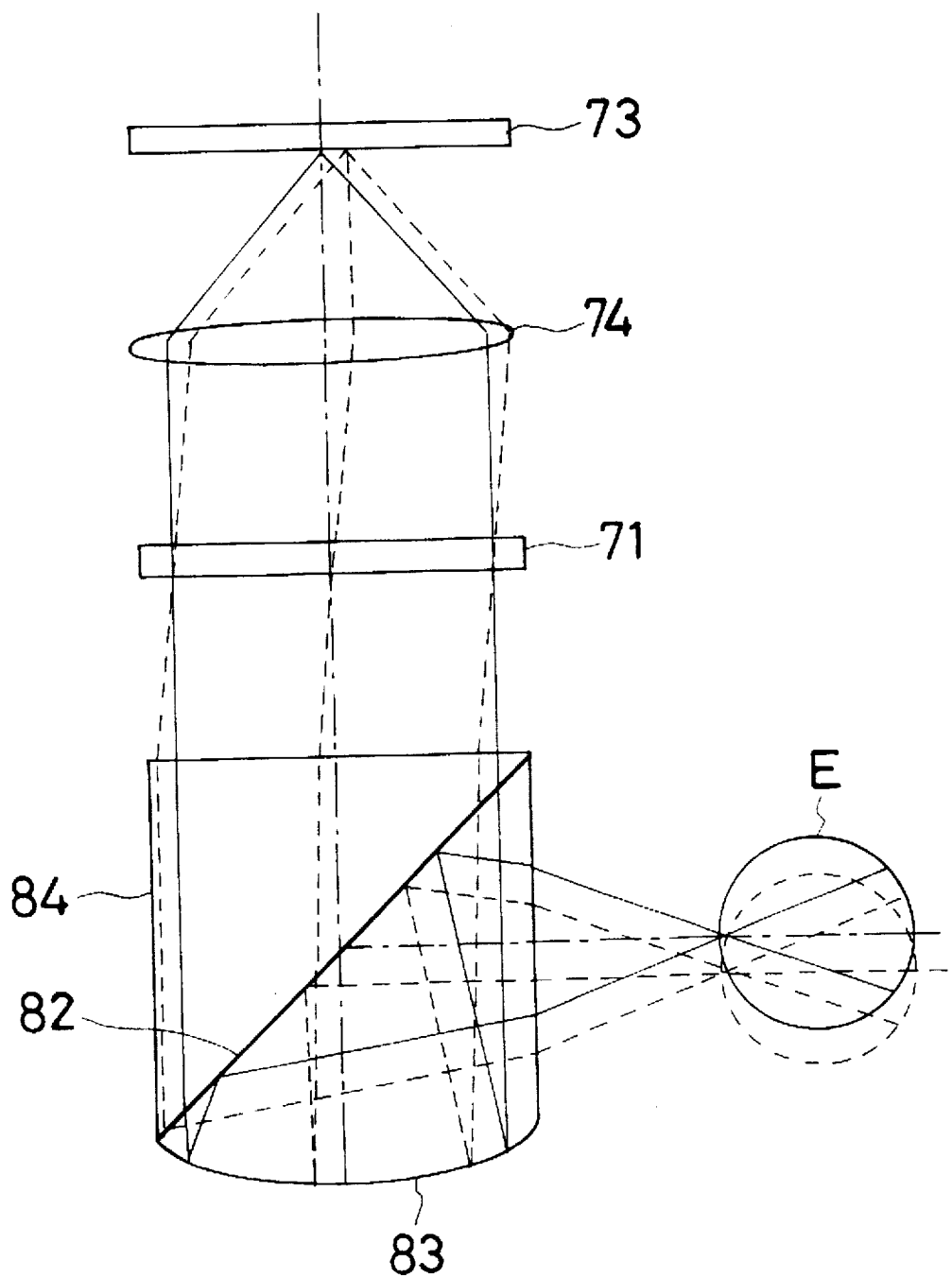
FIG. 28 schematically shows the arrangement of a modification of a projection optical system used in the present invention.

Although in the foregoing first to seventeenth embodiments an ocular lens is used as the projection optical system 72, it should be noted that the projection optical system 72 may be arranged in any form. For example, an ocular optical system such as that shown in FIG. 28 may be employed. That is, a beam splitter 82 is disposed at a tilt to the image display device 71, and a concave mirror 83 is disposed at a side of the beam splitter 82 to which a bundle of rays is transmitted by the beam splitter 82. In the illustrated example, the beam splitter 82 and the concave mirror 83 are integrated into one unit by using a prism 84. In the ocular optical system, a bundle of rays from the image display device 71 is first passed through the beam splitter 82 and then convergently reflected by the concave mirror 83. Then, the convergent light is reflected by the beam splitter 82 so as to focus into the pupil of the eyeball E.

Figure 29A:
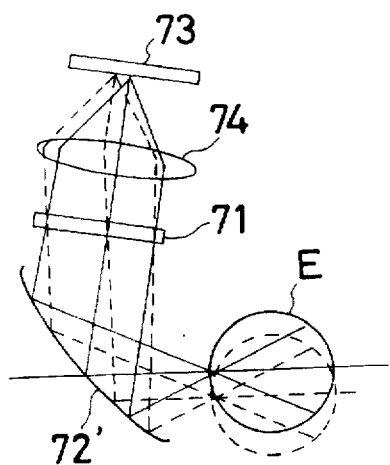
FIGS. 29(a) to 29(e) show various modifications of the entire optical system of the present invention.
Figure 29D:
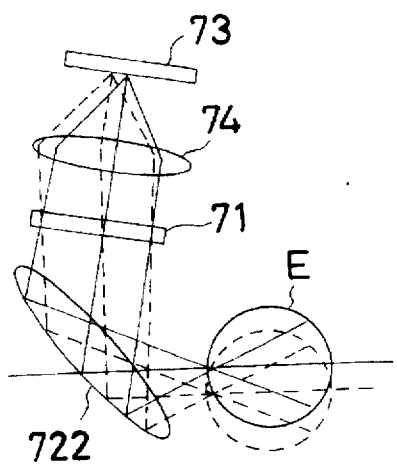
Figure 29B:
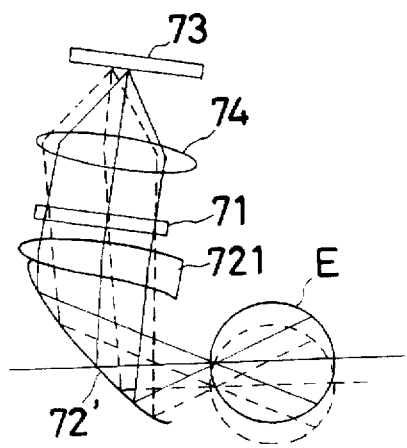
Figure 29E:
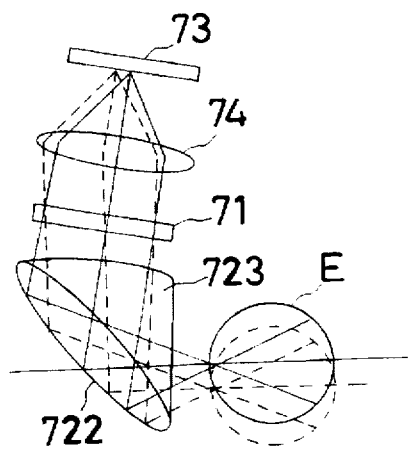
Figure 29C:
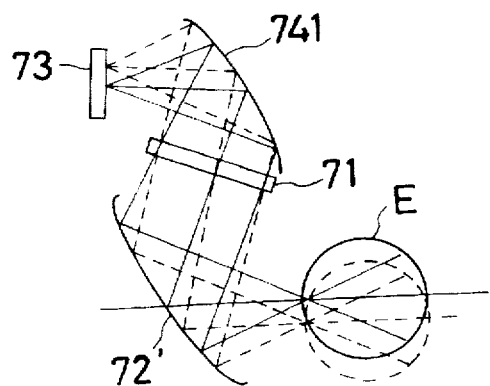

Further, the optical system of the present invention may be modified as shown in FIGS. 29(a) to 29(e). That is, as shown in FIG. 29(a), the ocular optical system may be formed by using a decentered mirror 72'. It is preferable for the decentered mirror 72' to employ a rotationally asymmetric aspherical surface. As shown in FIG. 29(b), a refracting optical element (decentered lens) 721 may be disposed between the LCD 71 and the decentered mirror 72'. It is preferable for the refracting optical element 721 to employ a rotationally asymmetric aspherical surface. As shown in FIG. 29(c), the illumination optical system may be formed by using a decentered condenser mirror 741. As shown in FIG. 29(d), the decentered mirror in the ocular optical system may be a decentered back-coated mirror 722. As shown in FIG. 29(e), a prism 723 for chromatic aberration correction may be cemented to the decentered back-coated mirror 722. It is also possible to other optical elements, as a matter of course. In arrangements such as those shown in FIGS. 28 and 29(a) to 29(e), a semitransparent mirror may be used as a mirror constituting the ocular optical system to form a see-through type image display apparatus which enables the outside world to be alternatively observed or superimposed on the electronic image.

Further, the two-dimensional image display device 71 is not necessarily limited to a liquid crystal display device (LCD). It is possible to use any type of two-dimensional image display device in which an image is displayed on a display surface illuminated by illuminating light from an illumination light source.

Figure 30:
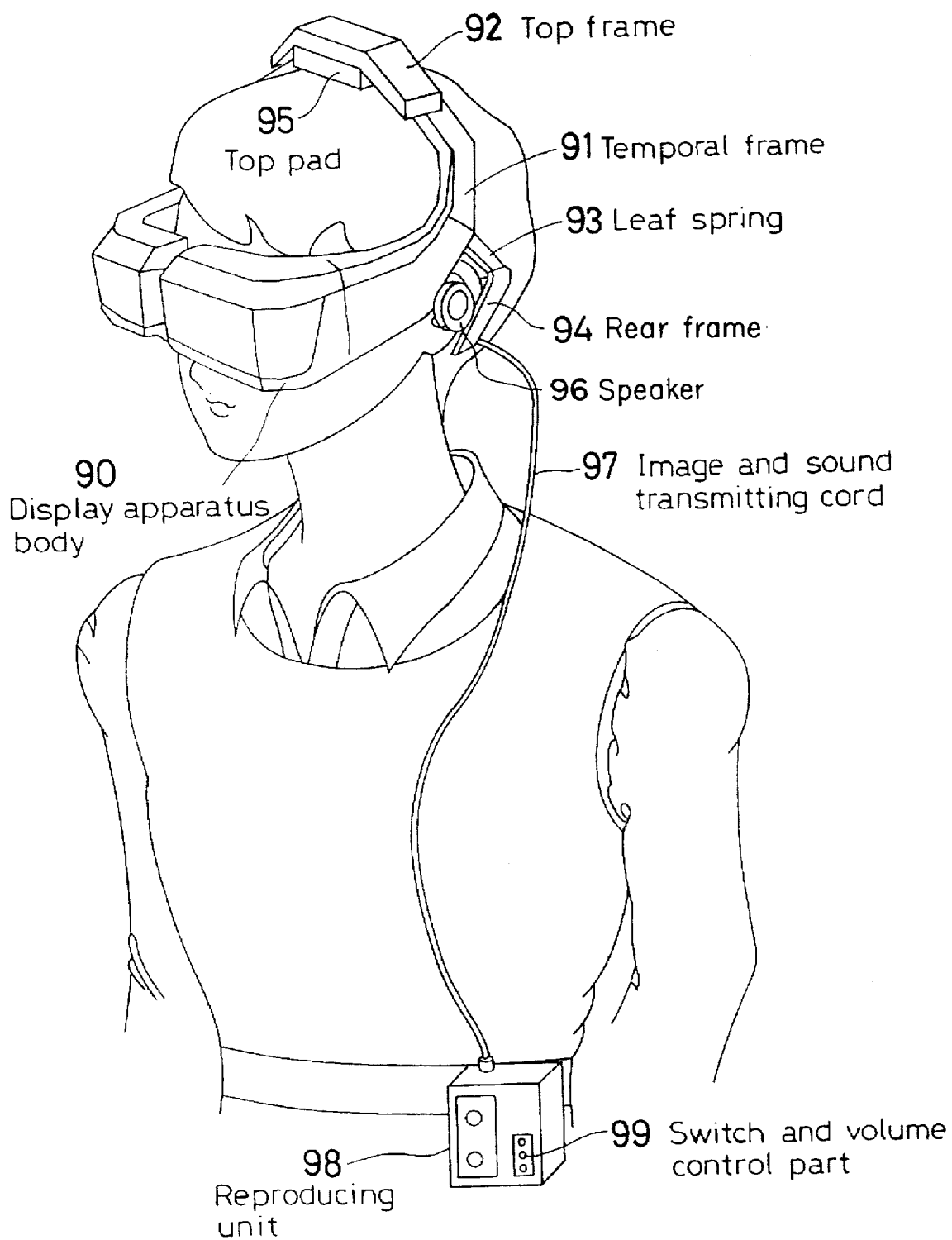
FIG. 30 shows the whole arrangement of a system in which the image display apparatus of the present invention is arranged as a head-mounted image display apparatus.
Figure 31:
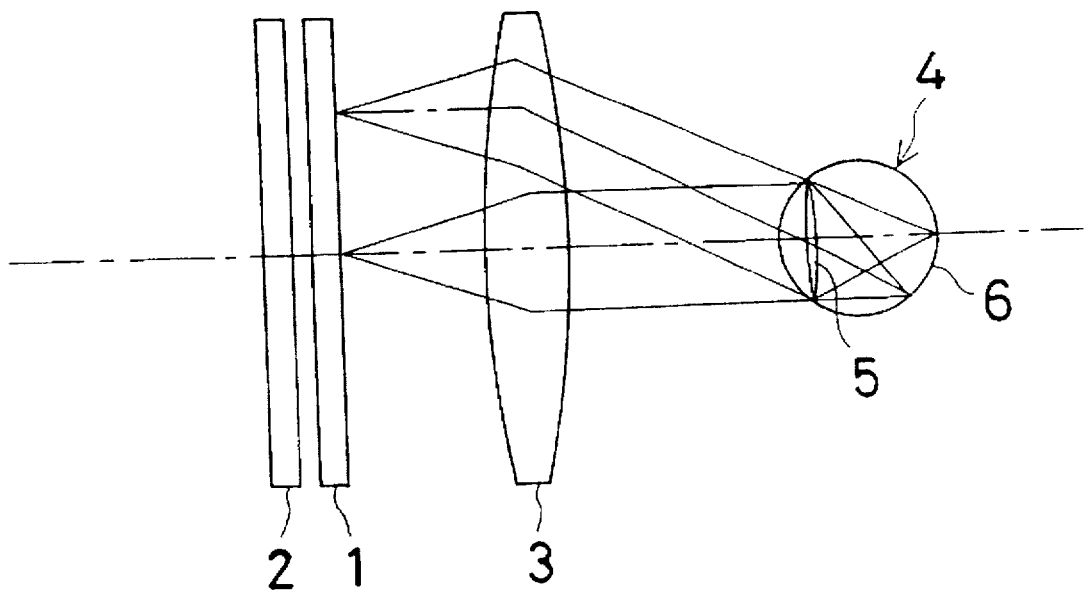
FIG. 31 shows an example of the optical system of a conventional eyeball projection type head-mounted image display apparatus.
Figure 32:
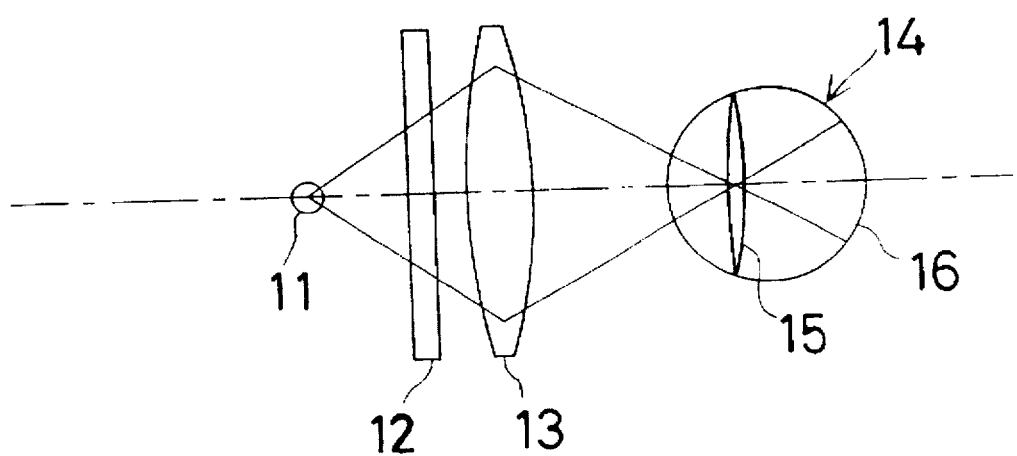
FIG. 32 shows an example of the optical system of another conventional eyeball projection type head-mounted image display apparatus.
Figure 33:
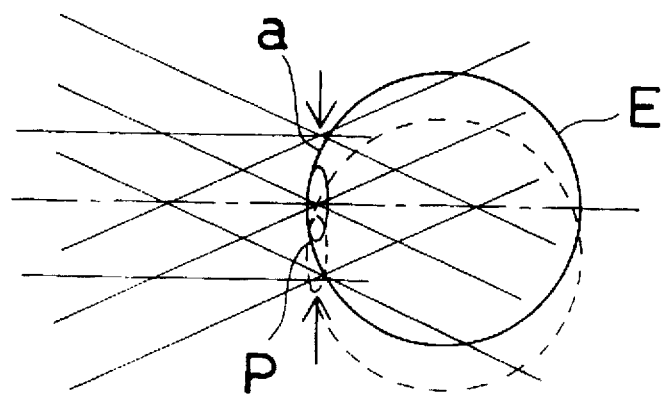
FIGS. 33(a) and 33(b) show actions in a case where the diameter of the exit pupil of a projection optical system is enlarged.
Figure 33:
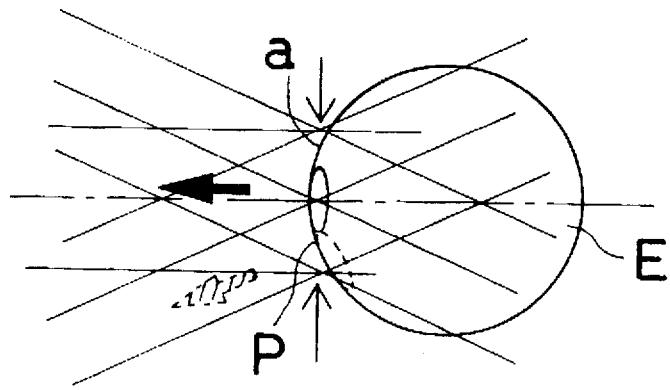

Incidentally, it is possible to form a head-mounted image display apparatus which enables the observer to see with both eyes by preparing an image display apparatus according to any of the above-described ninth to seventeenth embodiments for each of the left and right eyes (for both eyes in the case of the arrangements shown in FIGS. 18 and 20 to 22), and supporting the pair of image display apparatuses apart from each other by the distance between the eyes. FIG. 30 shows the whole arrangement of an example of such an image display system. The display apparatus body 90 has a pair of left and right display apparatuses according to any of the above-described embodiments, and an LCD as a two-dimensional image display device is disposed at the image plane of each display apparatus. The body 90 is provided with a pair of left and right temporal frames 91 which are contiguous with the left and right ends of the body 90, as illustrated in the figure. The two temporal frames 91 are connected by a top frame 92. In addition, a rear frame 94 is attached to the intermediate portion of each temporal frame 91 through a leaf spring 93. Thus, by applying the rear frames 94 to the rear portions of the observer's ears like the temples of a pair of glasses and placing the top frame 92 on the top of the observer's head, the display apparatus body 90 can be held in front of the observer's eyes. It should be noted that a top pad 95, which is an elastic material such as a sponge, is attached to the inner side of the top frame 92, and a similar pad is attached to the inner side of each rear frame 94, thereby allowing the user to wear the display apparatus on his or her head without feeling uncomfortable.

Further, a speaker 96 is provided on each rear frame 94 to enable the user to enjoy listening to stereophonic sound in addition to image observation. The display apparatus body 90 having the speakers 96 is connected with a reproducing unit 98, e.g., a portable video cassette unit, through an image and sound transmitting cord 97. Therefore, the user can enjoy not only observing an image but also listening to sound with the reproducing unit 98 retained on a desired position, e.g., a belt, as illustrated in the figure. It should be noted that reference numeral 99 in the figure denotes a switch and volume control part of the reproducing unit 98. It should be noted that the top frame 92 contains electronic parts such as a circuit for determining one or some point light sources which are conjugate to the detected pupil position, as shown in FIG. 24, and image and sound processing circuits.

The cord 97 may have a jack and plug arrangement attached to the distal end thereof so that the cord 97 can be detachably connected to an existing video deck. The cord 97 may also be connected to a TV signal receiving tuner so as to enable the user to enjoy watching TV. Alternatively, the cord 97 may be connected to a computer to receive computer graphic images or message images or the like from the computer. To eliminate the bothersome cord, the head-mounted image display apparatus may be arranged to receive external radio signals through an antenna connected thereto.

Although the image display apparatus of the present invention has been described by way of some embodiments, it should be noted that the present invention is not necessarily limited to the described embodiments, and that various changes and modifications may be imparted thereto.

As has been described above, according to the eyeball projection type image display apparatus of the present invention, the bundle of rays from the image display device is automatically adjusted so as to be projected into the pupil of the observer's eyeball at all times. Accordingly, the observer can see the image of the image display device without manually adjusting the positional relationship between his or her eyeball and the ray bundle from the image display device which is to be projected into the eyeball.

What we claim is:

1. An image display apparatus comprising:
   an image display device;
   illuminating means for illuminating said image display device;
   projecting means for projecting a bundle of rays from said image display device illuminated by said illuminating means into an observer's eyeball;
   positional relationship detecting means for detecting a positional relationship between said observer's eyeball and the bundle of rays which is to be projected into said observer's eyeball; and
   ray bundle moving means for moving the bundle of rays which is to be projected into said observer's eyeball according to the positional relationship detected by said positional relationship detecting means;
   wherein said illuminating means comprises a point light source;
   said projecting means comprises an optical element that projects an image of said image display device into said observer's eyeball by forming an image of said point light source at a position on a pupil of said observer's eyeball; and
   said ray bundle moving means is arranged to move the bundle of rays according to movement of position of said observer's eyeball such that the image of said point light source comes to said position on said pupil of said observer's eyeball.

2. An image display apparatus according to claim 1 wherein said ray bundle moving means is arranged to move said point light source.

3. An image display apparatus according to claim 2, wherein said ray bundle moving means is arranged to move said point light source along an optical axis.

4. An image display device according to claim 1, wherein said ray bundle moving means is arranged to move both said image display device and said projecting means.

5. An image display apparatus according to claim 1, further comprising movable reflecting means for turning back a bundle of rays from said point light source, wherein said ray bundle moving means is arranged to move said movable reflecting means.

6. An image display apparatus according to claim 1, further comprising a collimator lens which is disposed between said point light source and said image display device, wherein said ray bundle moving means is arranged to move said collimator lens.

7. An image display apparatus according to claim 1, wherein said ray bundle moving means is arranged to move said projecting means and also move said image display device in the same direction as the movement of said projecting means.

8. An image display apparatus according to claim 1, wherein movement of an image position of said point light source by said ray bundle moving means is performed according to a pupil position of said observer's eyeball detected by pupil position detecting means.

9. An image display apparatus comprising:
   an image display device;
   a projection optical system for projecting an image of said image display device into an observer's eyeball;
   a light source for illuminating said image display device; and
   an illumination optical system for leading a bundle of rays emitted from said light source to said image display device;
   wherein said light source comprises an array of a plurality of point light sources, said point light sources being arranged to turn on according to movement of said observer's eyeball such that only point light sources leading into said observer's eyeball are turned on, whereas the other point light sources are turned off, thereby projecting the image of said image display device through a pupil of said observer's eyeball at all times.

10. An image display apparatus according to claim 9, wherein said light source is disposed in the vicinity of a back focal point of said illumination optical system.

11. An image display apparatus according to claim 10, wherein said image display device is disposed in the vicinity of a front focal point of said illumination optical system.

12. An image display apparatus according to claim 9, further comprising means for detecting the pupil position of said observer's eyeball, so that, among said point light sources, only a point light source which is at or near a position conjugate to the pupil of said observer's eyeball is turned on.

13. An image display apparatus comprising:

left and right image display devices;

left and right projection optical systems for projecting images of said left and right image display devices into an observer's left and right eyeballs;

a light source which is disposed on an axis lying at a position equidistant from optical axes of said left and right projection optical systems to illuminate said left and right image display devices; and an illumination optical system for leading a bundle of rays emitted from said light source to said left and right image display devices, wherein said illumination optical system comprises a reflecting optical system.

14. An image display apparatus according to claim 13, wherein said reflecting optical system comprises a diffraction optical element.

* * * * *